(12) United States Patent
Chung et al.

(10) Patent No.: US 7,924,375 B2
(45) Date of Patent: Apr. 12, 2011

(54) IN-PLANE SWITCHING MODE LIQUID CRYSTAL DISPLAY DEVICE WITH ADJUSTABLE VIEWING ANGLE AND METHOD OF FABRICATING THE SAME

(75) Inventors: In Jae Chung, Gyeonggi-do (KR); Hyun Suk Jin, Gyeonggi-do (KR); Hyung Seok Jang, Gyeonggi-do (KR); Deuk Su Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 190 days.

(21) Appl. No.: 11/389,036

(22) Filed: Mar. 27, 2006

(65) Prior Publication Data

US 2007/0121047 A1 May 31, 2007

(30) Foreign Application Priority Data

Nov. 30, 2005 (KR) .................. 10-2005-0115569

(51) Int. Cl.
*G02F 1/1335* (2006.01)
*G02F 1/1343* (2006.01)
(52) U.S. Cl. ................ 349/114; 349/141; 349/143
(58) Field of Classification Search .............. None
See application file for complete search history.

(56) References Cited

U.S. PATENT DOCUMENTS

| 6,181,402 | B1* | 1/2001 | Shim et al. ........... 349/130 |
| 7,177,001 | B2* | 2/2007 | Lee ..................... 349/141 |
| 2001/0007487 | A1* | 7/2001 | Yoon et al. .......... 349/106 |
| 2002/0093615 | A1* | 7/2002 | Mun et al. ........... 349/143 |
| 2003/0117558 | A1* | 6/2003 | Kim et al. ........... 349/141 |

FOREIGN PATENT DOCUMENTS

| JP | 9-325346 A | 12/1997 |
| JP | 11-295717 A | 10/1999 |

OTHER PUBLICATIONS

Office Action issued Jan. 12, 2010 in corresponding Japanese Application No. 2006-153172.

* cited by examiner

*Primary Examiner* — Tina M Wong
(74) *Attorney, Agent, or Firm* — Morgan Lewis & Bockius LLP

(57) ABSTRACT

An in-plane switching mode liquid crystal display device includes a first substrate and a second substrate, gate lines and data lines intersecting each other on the first substrate and defining red, green, blue sub-pixels, and viewing angle controlling sub-pixels, thin film transistors at the intersections of the gate lines and the data lines, first pixel electrodes and first common electrodes spaced apart from each other and alternately disposed at the red, green, and blue sub-pixels, second pixel electrodes at the viewing angle controlling sub-pixels, second common electrodes on the second substrate and at positions corresponding to the second pixel electrodes, and a liquid crystal layer between the first substrate and the second substrate.

36 Claims, 17 Drawing Sheets

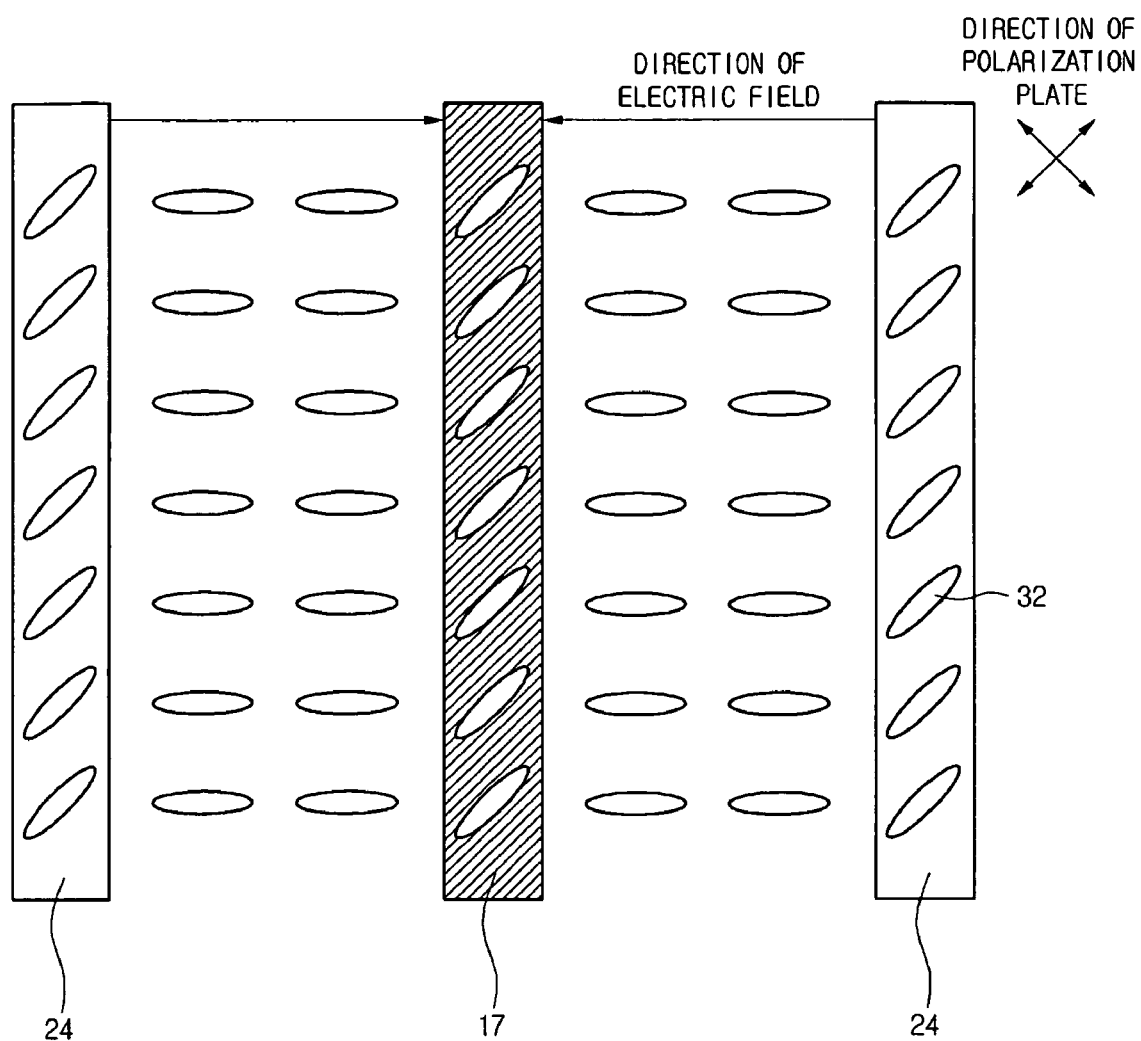

IN-PLANE SWITCHING MODE LIQUID CRYSTAL DISPLAY DEVICE WITH ADJUSTABLE VIEWING ANGLE AND METHOD OF FABRICATING THE SAME

This application claims the benefit of the Korean Patent Application No. 115569/2005, filed Nov. 30, 2005, which is hereby incorporated by reference in its entirety.

BACKGROUND OF THE INVENTION

1. Field of the Invention

The present invention relates to a liquid crystal display device, and more particularly, to an in-plane switching mode liquid crystal display device with an adjustable viewing angle and a method of fabricating the same. Although the present invention has a wide scope of applications, it is particularly suitable for protecting a personal display device user's privacy and/or security in a crowed public place by selectively operating viewing angles of a personal display device having an in-plane switching mode LCD panel screen.

2. Description of the Related Art

A liquid crystal display device has drawn the most attention among flat display devices. This is because the liquid crystal display device can be operated with a low power and a high definition. It also can be manufactured in a small volume and a large size compared to a cathode ray tube. In general, a liquid crystal display device is operated by changing optical anisotropy through electric fields applied to liquid crystal having both mobility of liquid and optical characteristics of crystal. The liquid crystal display device may be realized in a variety of modes depending on the property of liquid crystal and the structure of a liquid crystal pattern. More specifically, the liquid crystal display device can be operated in a twisted nematic (TN) mode, a multi-domain mode, an optically compensated birefringence (OCB) mode, an in-plane switching (IPS) mode, and a vertical alignment (VA) mode.

In a twisted nematic (TN) mode, directors of liquid crystal are arranged such that they are 90° twisted and are applied by an electric field to control the directors. A multi-domain mode is operated in which one pixel is divided into a plurality of domains to change a direction of the main viewing angle in each domain, to thereby provide a wide viewing angle. In an optically compensated birefringence (OCB) mode, a compensation film is attached to on the outer surface of a substrate to compensate for a phase change in light. In an in-plane switching (IPS) mode, two electrodes are formed on one substrate so that directors of liquid crystal twisted in a plane parallel to an alignment layer. A vertical alignment (VA) mode allows long axes of liquid crystal molecules to be arranged vertically to an alignment layer plane by using negative liquid crystal and a vertical alignment layer.

Among other modes described above, the in-plane switching mode liquid crystal display device includes a color filter substrate (referred to as an upper substrate) and a thin film array substrate (referred to as a lower substrate) disposed to face each other and having a liquid crystal layer between the two substrates. In addition, a black matrix for preventing a light leakage is formed on the upper substrate, and a color filter layer consisting of R, B, and G color resists for realizing colors is formed on the black matrix.

Also, the lower substrate includes gate lines and data lines defining a unit pixel, switching devices formed on intersections between the gate lines and the data lines, and a common electrode and pixel electrodes arranged to alternately cross each other and generating a transverse electrical field.

A related art in-plane switching mode liquid crystal display device will be described with reference to the accompanying drawings.

FIG. 1 is a plan view of an in-plane switching mode liquid crystal display device according to a related art, and FIG. 2 is a cross-sectional view taken along I-I of FIG. 1.

Initially referring to FIG. 1, gate lines 12 and data lines 15 perpendicularly arranged to cross each other on a lower substrate 11, to thereby define pixels, thin film transistors (TFTs) arranged on intersections where the gate lines 12 and the data lines 15 intersect, a common line 25 arranged within each of the pixels to be parallel to the gate lines 12, a plurality of common electrodes 24 branching off from the common line 25 and parallel to the data lines 15, a plurality of pixel electrodes 17 each being connected to each of drain electrodes of the thin film transistors and arranged alternately between the common electrodes 25 in parallel with and with respect to the common electrodes 25, and capacitor electrodes 26 each extending from each of the pixel electrodes 17 and overlapping the upper portion of the common line 25.

Each of the thin film transistors includes a gate electrode 12a branching off from each of the gate lines 12, a gate insulation layer (not shown) formed on the entire surface including the gate electrode 12a, a semiconductor layer 14 formed on the gate insulation layer on the gate electrode 12a, and a source electrode 15a and a drain electrode 15b branching off from each of the data lines 15 and formed at both ends of the semiconductor layer 14.

Each of the pixel electrodes 17 is connected to the drain electrode 15b through a drain contact hole 19. Also, each of the common line 25 and the common electrodes 24 is integrally formed, and simultaneously formed with the gate lines 12. Each of the common line 25 and the common electrodes 24 is formed of low resistance metal such as Cu, Al, Cr, Mo, and Ti.

The pixel electrodes 17 and the common electrodes 24 are alternately formed with respect to each other. The pixel electrodes may be simultaneously formed with the data lines 15 or may be formed of a different layer from the data lines 15. The common electrodes 24 and the pixel electrodes 17 may be alternately formed in a straight line, or may be formed in a zigzag pattern with respect to each other.

The common electrodes 24 and the pixel electrodes 17 may be formed of transparent conductive metal having a desirable light transmittance such as indium-tin-oxide (ITO). A liquid crystal display device having the above-described structure is also called an ITO-ITO electrode IPS liquid crystal display device.

Referring to FIG. 2, an insulation layer is further provided between the common electrodes 24 and the pixel electrodes 17 in order to electrically isolate the common electrodes 24 from the pixel electrodes 17. A reference numeral 13 of FIG. 2 represents a gate insulation layer formed of silicon nitride or silicon oxide.

The common electrodes 24 may be formed first as described above, the pixel electrodes 17 may be formed later, and then portions therebetween may be filled with an insulation layer to electrically isolate common electrodes 24 from the pixel electrodes 17. As an alternative, the pixel electrodes 17 may be formed first, the common electrodes 24 may be formed later, and then the portions therebetween may be filled with an insulation layer to separate common electrodes 24 from the pixel electrodes 17. Also, the common electrodes 24 and the pixel electrodes 17 may be formed of the same layer without an intervening insulation layer. A protective layer 16 for protecting a variety of patterns is further formed on the entire surface including the pixel electrodes 17.

Referring back to FIG. 2, black matrixes 22 preventing a light leakage are provided on an upper substrate (i.e., color filter substrate) 21, and a color filter layer 23 consisting of R, G, and B color resists is provided between the black matrixes. An overcoat layer 29 protecting the color filer layer 23 and planarizing the surface of the color filter layer 23 is provided on the color filter layer 23. The black matrixes 23 extend up to the common electrodes 24 within the pixels located at both ends of the lower substrate 11 to prevent a light leakage from the edge of the pixels.

Also, it is possible to allow the common electrodes 24 located at the edged of the pixels to overlap the data lines 15 and to perform a function of the black matrix 22. In this case, each of the common electrodes 24 should be formed of a light-blocking layer such as a metal layer.

The lower substrate 11 and the color filter substrate 21 of the in-plane switching mode liquid crystal display device are coupled to face each other using a sealant (not shown) having an adhesive characteristic, and a liquid crystal layer 31 is formed between the two substrates as illustrated in FIG. 2.

According to the in-plane switching mode liquid crystal display device having the above-described construction, both the common electrodes 24 and the pixel electrodes 17 are formed on the same substrate in order to rotate liquid crystal molecules 32 while maintaining the liquid crystal molecules parallel to the lower substrate 11. A voltage is applied between the two electrodes to generate a transverse electric field with respect to the lower substrate 11.

This transverse electric field reduces birefringence change of the liquid crystal with respect to a viewing direction. Therefore, the in-plane switching mode liquid crystal display device provides a desirable viewing angle characteristic compared to a twisted nematic mode liquid crystal display device according to the related art.

FIG. 3 is a view illustrating a voltage distribution of a related art in-plane switching mode liquid crystal display device, and FIGS. 4A and 4B are plan views without applying a voltage and with applying a voltage, respectively.

Referring to FIG. 3, when a voltage of 5V is applied to each of the common electrodes 24 and a voltage of 0V is applied to each of the pixel electrodes 17, an equipotential surface is distributed parallel to each of the electrodes 24 and 17 in a portion right above the electrodes 24 and 17, and the equipotential surface is distributed almost vertically in a region located between the two electrodes 24 and 17.

Since the direction of the electric fields is perpendicular to the equipotential surface, a horizontal electric field rather than a vertical electric field is formed in a region located between the common electrode 24 and the pixel electrode 17. Also, a vertical electric field rather than a horizontal electric field is formed in a region located above each of the electrodes 24 and 17, and both the horizontal electric field and the vertical electric field are formed in a composite manner in a region located over the edges of each of the electrodes 24 and 17.

In the in-plane switching mode liquid crystal display device, an arrangement of liquid crystal is controlled by using electric fields. When a sufficient voltage is applied to liquid crystal molecules 32 initially oriented to the same direction as that of a transmittance axis of one of polarization plates as illustrated in FIG. 4A, the long axes of the liquid crystal molecules 32 are oriented parallel to the direction of the electric field as illustrated in FIG. 4B. On the other hand, when the liquid crystal molecules have negative dielectric anisotropy, the short axes of the liquid crystal molecules are oriented parallel to the direction of the electric field.

More specifically, a first polarization plate and a second polarization plate attached on outer surfaces of the lower substrate and the upper substrate to face each other are arranged such that their transmittance axes are perpendicular to each other. A normally black mode is achieved by forming a rubbing direction of an alignment layer on the lower substrate to be parallel with respect to a transmittance axis of one of the polarization plates.

That is, when a voltage is not applied, the liquid crystal molecules 32 are oriented as illustrated in FIG. 4A to display a black state. On the contrary, when a voltage is applied, the liquid crystal molecules 32 are oriented parallel to the direction of the electric field as illustrated in FIG. 4B, to thereby display a white state.

As described above, the related art in-plane switching mode liquid crystal display device has an advantage of having a wide viewing angle. However, there is an occasion where this advantage may cause a problem. For example, when a user uses a personal display device equipped with an IPS mode LCD panel at a public place, his/her privacy and/or security can be invaded by an adjacent person's peek.

To solve this problem, additional liquid crystal panel controlling a viewing angle can be attached on a main liquid crystal panel in order to protect a user's privacy or for a security purpose. The additional liquid crystal panel causes an excessive light leakage in a black state in a horizontal viewing angle direction, so that it can narrow the viewing angle. However, in this case, not only the liquid crystal panel for a viewing angle control should be additionally manufactured, but also the thickness and the weight of a product increase more than twice. Also, when the liquid crystal panel for the viewing angle control and the main liquid crystal panel are attached to each other, a misalign may be occurred. Also, since the light incident from a backlight assembly should further pass through the liquid crystal panel for the viewing angle control when the liquid crystal display device is used in a wide viewing angle mode, front brightness may be considerably reduced.

SUMMARY OF THE INVENTION

Accordingly, the present invention is directed to an in-plane switching mode liquid crystal display device with an adjustable viewing angle and a method of fabricating the same that substantially obviate one or more problems due to limitations and disadvantages of the related art.

An object of the present invention is to provide an in-plane switching mode liquid crystal display device with an adjustable viewing angle and a method of fabricating the same in which a notebook user's privacy and/or security can be protected even in a crowed public place by forming red, green, blue sub-pixels, and viewing angle controlling sub-pixels.

Another object of the present invention is to provide an in-plane switching mode liquid crystal display device with an adjustable viewing angle and a method of fabricating the same in which a narrow viewing angle mode and a wide viewing angle mode can be selectively operated.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described, an in-plane switching mode liquid crystal display device includes a first substrate and a second substrate, gate lines and data lines intersecting each other on the first substrate and defining red, green, blue sub-pixels, and viewing angle controlling sub-pixels, thin film transistors at the intersections of the gate lines and the data lines, first pixel electrodes and first common electrodes spaced apart from each other and alternately disposed at the red, green, and blue sub-pixels, second pixel electrodes at the viewing angle controlling sub-pixels, second common electrodes on the second substrate and at positions corresponding to the second pixel electrodes, and a liquid crystal layer between the first substrate and the second substrate.

In another aspect of an embodiment, a method of fabricating an in-plane switching mode liquid crystal display device includes forming gate lines and data lines intersecting each other on a first substrate and defining red, green, and blue sub-pixels, and viewing angle controlling sub-pixels, forming transistors on the intersections of the gate lines and the data lines, forming first common electrodes parallel to the data lines and first pixel electrodes alternately arranged with respect to the first common electrodes at the red, green, and blue sub-pixels, forming second pixel electrodes at the viewing angle controlling sub-pixels, forming second common electrodes at positions corresponding to the second pixel electrodes at the second substrate, and forming a liquid crystal layer between the first substrate and the second substrate.

In another aspect of an embodiment, a liquid crystal display device includes red, green, and blue sub-pixels having first pixel electrodes and first common electrodes alternately disposed on a first substrate, viewing angle controlling sub-pixels having second pixel electrodes on the first substrate and second common electrodes on a second substrate, and a liquid crystal layer between the first substrate and the second substrate.

In a further aspect of an embodiment, a liquid crystal display device includes first and second substrates facing each other, gate lines and data lines intersecting each other on the first substrate and defining at least four sub-pixels of first to fourth sub-pixels within a unit pixel, thin film transistors at the intersections of the gate lines and the data lines, first pixel electrodes and first common electrodes spaced apart from each other and alternately disposed at the first to third sub-pixels, second pixel electrodes at the fourth sub-pixel where the first pixel electrodes and first common electrodes are not disposed, the fourth sub-pixel being operated in a wide viewing angle mode during an off-state and in a narrow viewing angle mode during an on-state, second common electrodes on the second substrate and at positions corresponding to the second pixel electrodes, and a liquid crystal layer between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A and 4B are plan views without applying a voltage and with applying a voltage, respectively;

DETAILED DESCRIPTION OF THE PREFERRED EMBODIMENTS

Reference will now be made in detail to the preferred embodiments of the present invention, examples of which are illustrated in the accompanying drawings.

Figure 1:
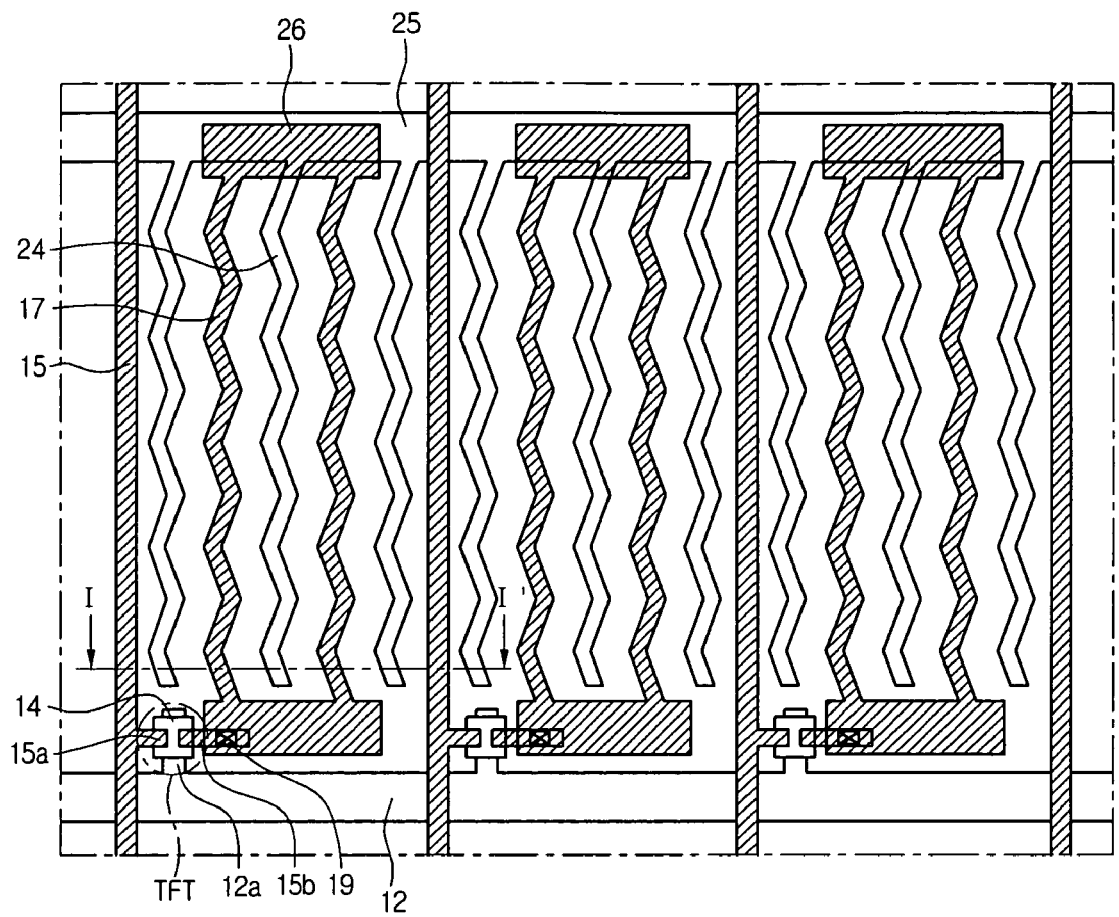
FIG. 1 is a plan view of an in-plane switching mode liquid crystal display device according to a related art.
Figure 2:
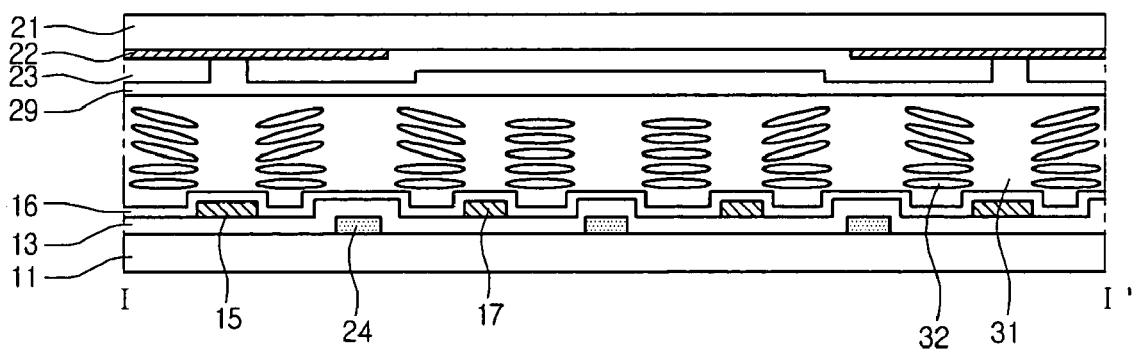
FIG. 2 is a cross-sectional view taken along I-I of FIG. 1.
Figure 3:
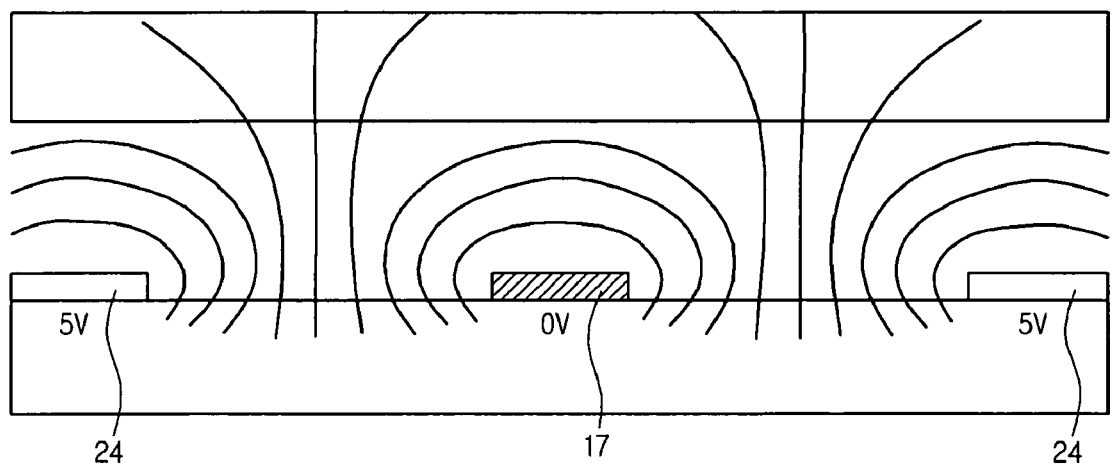
FIG. 3 is a view illustrating a voltage distribution of an in-plane switching mode liquid crystal display device.
Figure 4A:
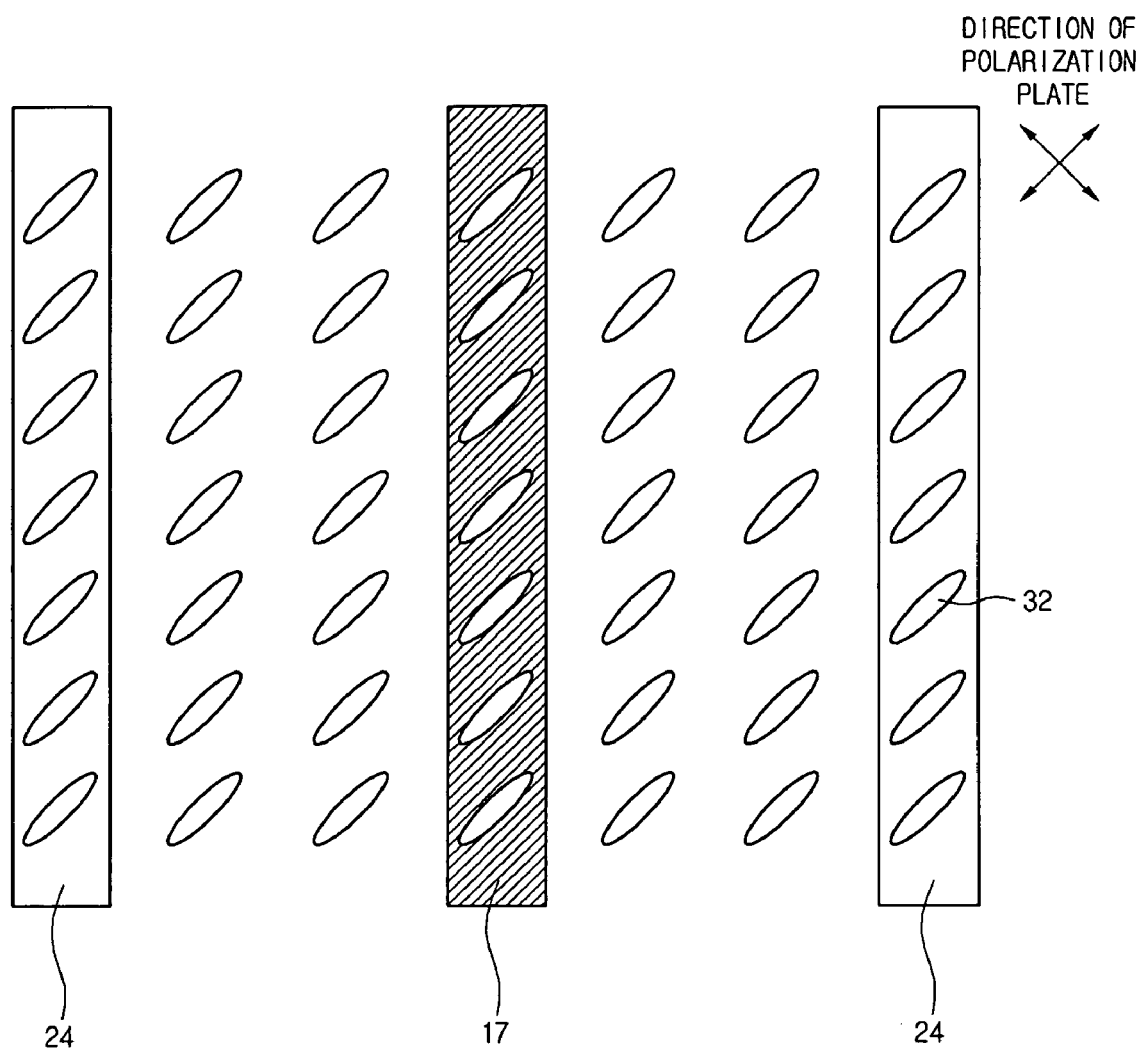
Figure 5:
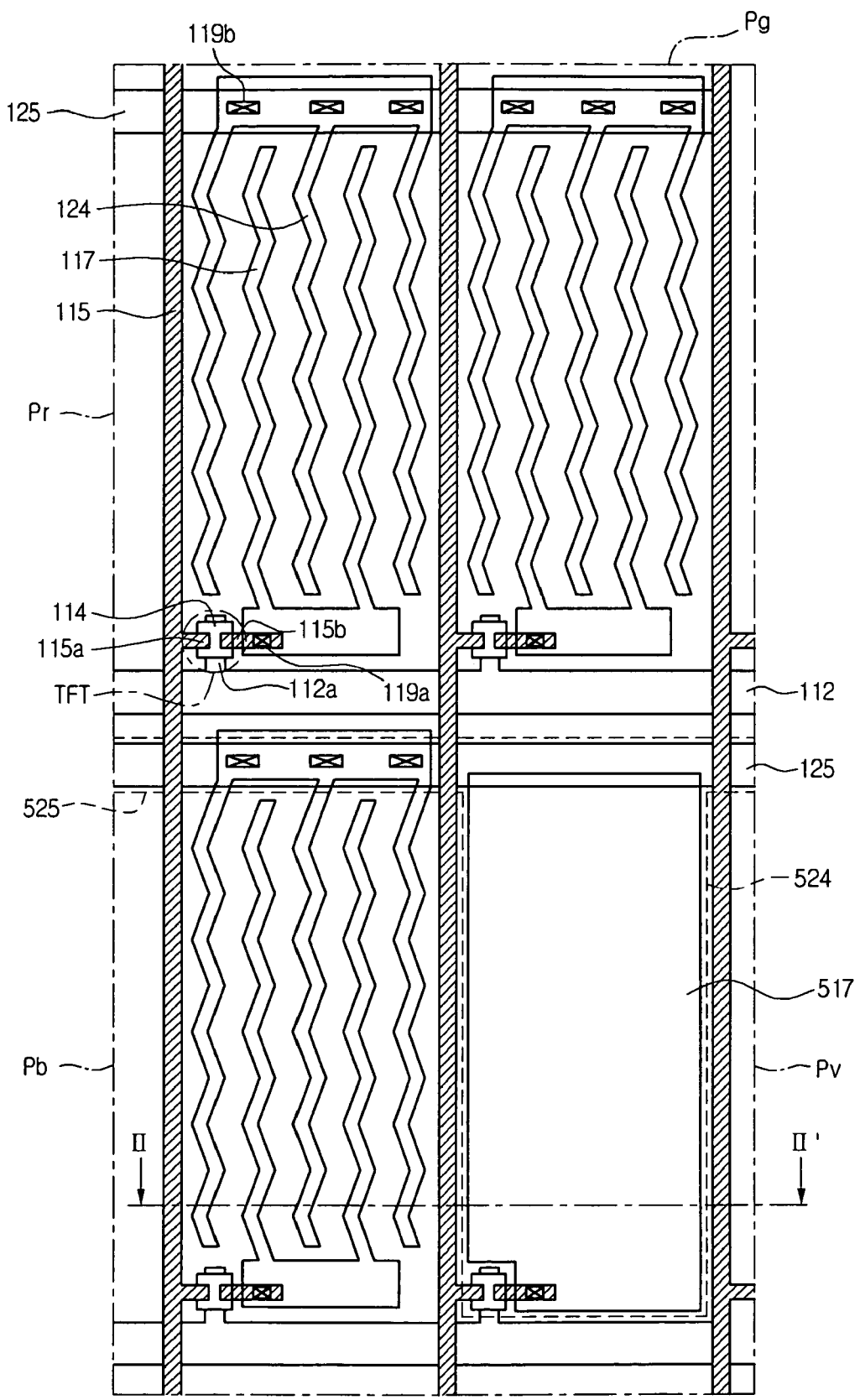
FIG. 5 is a plan view illustrating an in-plane switching mode liquid crystal display device according to an embodiment of the present invention.
Figure 6A:
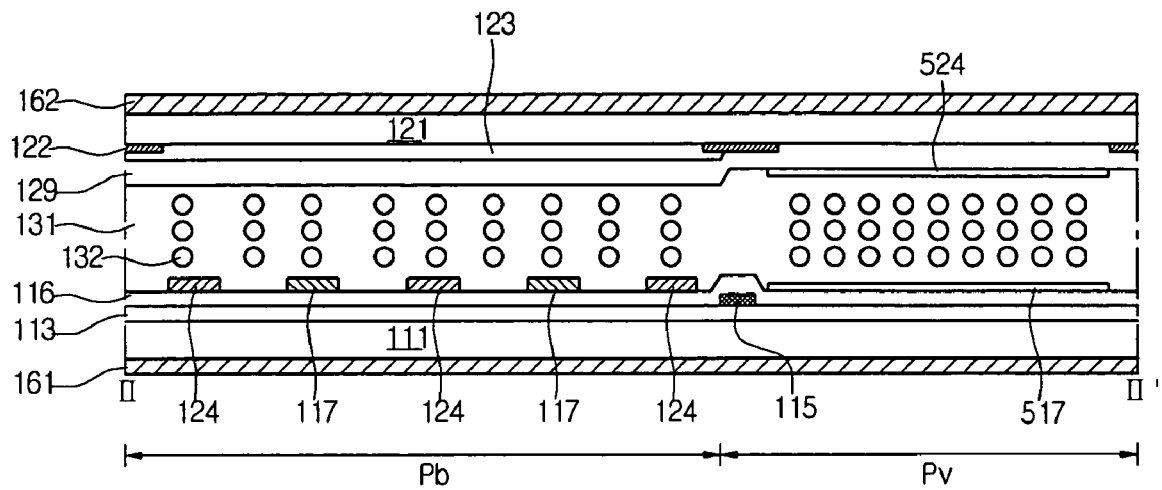
FIGS. 6A and 6B are cross-sectional views of a wide viewing angle mode taken along II-II of FIG. 5.
Figure 6B:
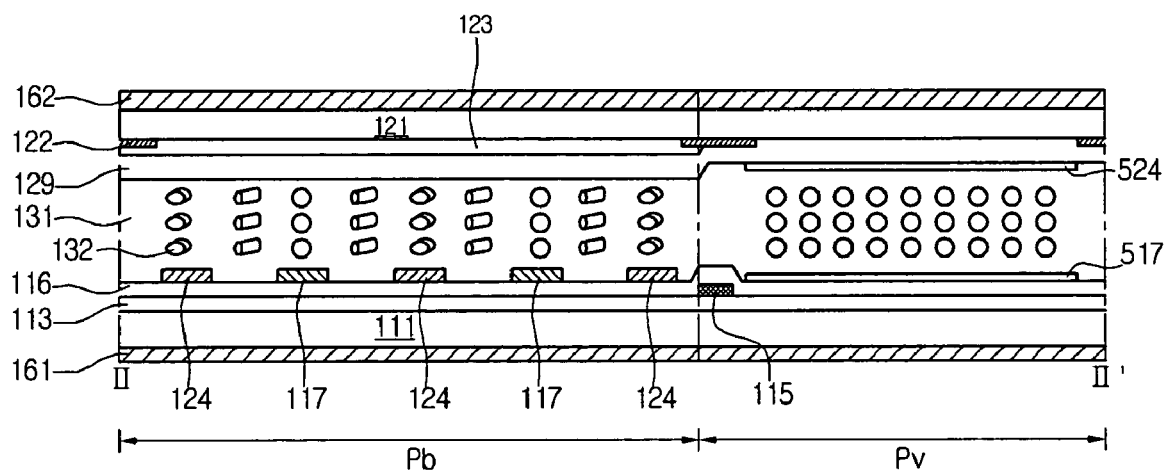

FIG. 5 is a plan view illustrating an in-plane switching mode liquid crystal display device according to an embodiment of the present invention, and FIGS. 6A and 6B are cross-sectional views of a wide viewing angle mode taken along II-II of FIG. 5.

A liquid crystal display device according to the first embodiment of the present invention includes a lower substrate, an upper substrate, and a liquid crystal layer interposed between the lower substrate and the upper substrate. Also, the liquid crystal display device further includes a red sub-pixel, a green sub-pixel, a blue sub-pixel, and a viewing angle controlling sub-pixel.

The red, green, and blue sub-pixels formed in the upper substrate include red, green, and blue color filters, respectively. Each of the viewing angle controlling sub-pixels includes a viewing angle controlling common electrode instead of a color filter.

Also, the viewing angle controlling common electrode is connected with a viewing angle controlling common line, which extends to an outer edge of a liquid crystal display panel.

A plurality of common electrodes and pixel electrodes are alternately formed in the red, green, and blue sub-pixels of the lower substrate to generate a transverse electric field with applying a voltage. Each of viewing angle controlling pixel electrodes is formed in the shape of a stave to face each of the viewing angle controlling common electrodes to generate a vertical electric field between each of viewing angle controlling pixel electrodes and each of the viewing angle controlling common electrodes with applying a voltage.

When each of the viewing angle controlling sub-pixels is in an off-state, the liquid crystal display device operates in a wide viewing angle mode using the red, green, and blue sub-pixels. On the contrary, when each of the viewing angle controlling sub-pixels is in an on-state, the liquid crystal display device operates in a narrow viewing angle mode by the generated light leakage at a side viewing angle. The viewing angle range is controlled by controlling at least one voltage level applied to each of the second pixel electrodes when each of the viewing angle controlling sub-pixels is driven in a narrow viewing angle mode.

A construction of an embodiment of the present invention will now be described in more detail with reference to the accompanying drawings.

Referring to FIGS. 5, 6A, and 6B, a lower substrate 111 of a liquid crystal display device according to an embodiment of the present invention includes a plurality of gate lines 112 arranged in lines and a plurality of data lines 115 vertically intersecting the gate lines 112, the gate and data lines 112 and 115 defining sub-pixels Pr, Pg, Pb, and Pv. Thin film transistors (TFTs) are formed on the intersections between the data and gate lines to switch a voltage in red, green, and blue sub-pixels Pr, Pg, and Pb. Further, a plurality of common electrodes Vcom 124 each being connected with each of common lines 125 parallel to the gate lines 112 and vertically branching into a unit pixel. Each pixel electrode 117 is connected with each of the thin film transistors and parallel to the common electrodes 124.

Referring to FIGS. 6A and 6B, a gate insulation layer 113 formed by depositing an inorganic insulation layer such as SiNx and SiOx using plasma enhanced chemical vapor deposition (PECVD) is further formed between the gate lines 112 and the data lines 115.

The viewing angle controlling sub-pixels Pv include thin film transistors at each of the intersections between the gate lines 112 and the data lines 115 to switch a voltage, and viewing angle controlling pixel electrodes 517 connected with the thin film transistors and having a stave shape within each of the viewing angle controlling sub-pixels Pv.

One of an inorganic insulation material such as SiNx and SiOx and an organic insulation material such as Benzocyclobutene (BCB) and acryl based material is coated on the entire surface including the data line 115 to form a protective film 116, which planarizes the entire surface and protects a pattern formed therein.

Each of the thin film transistors includes a gate electrode 112a branching off from each of the gate lines 112, a gate insulation layer 113 formed on the entire surface including the gate electrode 112a, a semiconductor layer 114 formed by sequentially depositing undoped amorphous silicon (a-Si) and doped amorphous silicon (n+a-Si), which is formed by ion-implanting impurities into the gate insulation layer 113 on the gate electrode 112a, and source/drain electrodes 115a and 115b branching off from each of the data lines 115 and being formed on both edges of the semiconductor layer 114. Each of the thin film transistors controls a voltage applied to a unit pixel P. Also, each of the pixel electrodes 117 is connected with the drain electrode 115b through a first contact hole 119a.

The gate lines 112 and data lines 115 may be formed of low resistance metal such as Cu, Al, aluminum neodymium (AlNd), Mo, Cr, Ti, Ta, and MoW. The common lines 125 are simultaneously formed with the formation of the gate lines 112.

Also, the common electrodes 124 and the pixel electrodes 117 are simultaneously formed of transparent conductive metal having desirable light transmittance such as indium-tin-oxide or indium-zinc-oxide. The common electrodes 124 may be formed of a low resistance metal layer, branching from the common lines 125 when the common lines 125 are formed.

That is, the common electrodes 124 may be formed of indium-tin-oxide or indium-zinc-oxide, which is a transparent conductive material through which light may be transmitted. Then common electrodes 124 may be formed of the same layer as the pixel electrodes 117. Alternatively, it may be formed of the same layer as the gate lines 112. Also, the common electrodes 124 may be formed in an upper layer on the pixel electrodes 117, or may be formed in a lower layer under the pixel electrodes 117. Also, the pixel electrodes 117 can be formed of the same layer as the common electrodes 124 as long as the pixel electrodes 117 and the common electrodes do not cause short-circuit.

An end of each of the common electrodes 124 is electrically connected to each of the common lines 125 through a second contact hole 119b, so that a voltage from each of the common lines 125 can be applied thereto. To apply a voltage, the pixel electrodes 117 are integrated in their one ends to be connected to the drain electrode 115b of each of the thin film transistors. Each of the common electrodes 124 and the pixel electrodes 117 is formed in a straight line or in a zigzag form. The common electrodes 124 and the pixel electrodes 117 are alternately formed parallel to each other.

Figure 12:
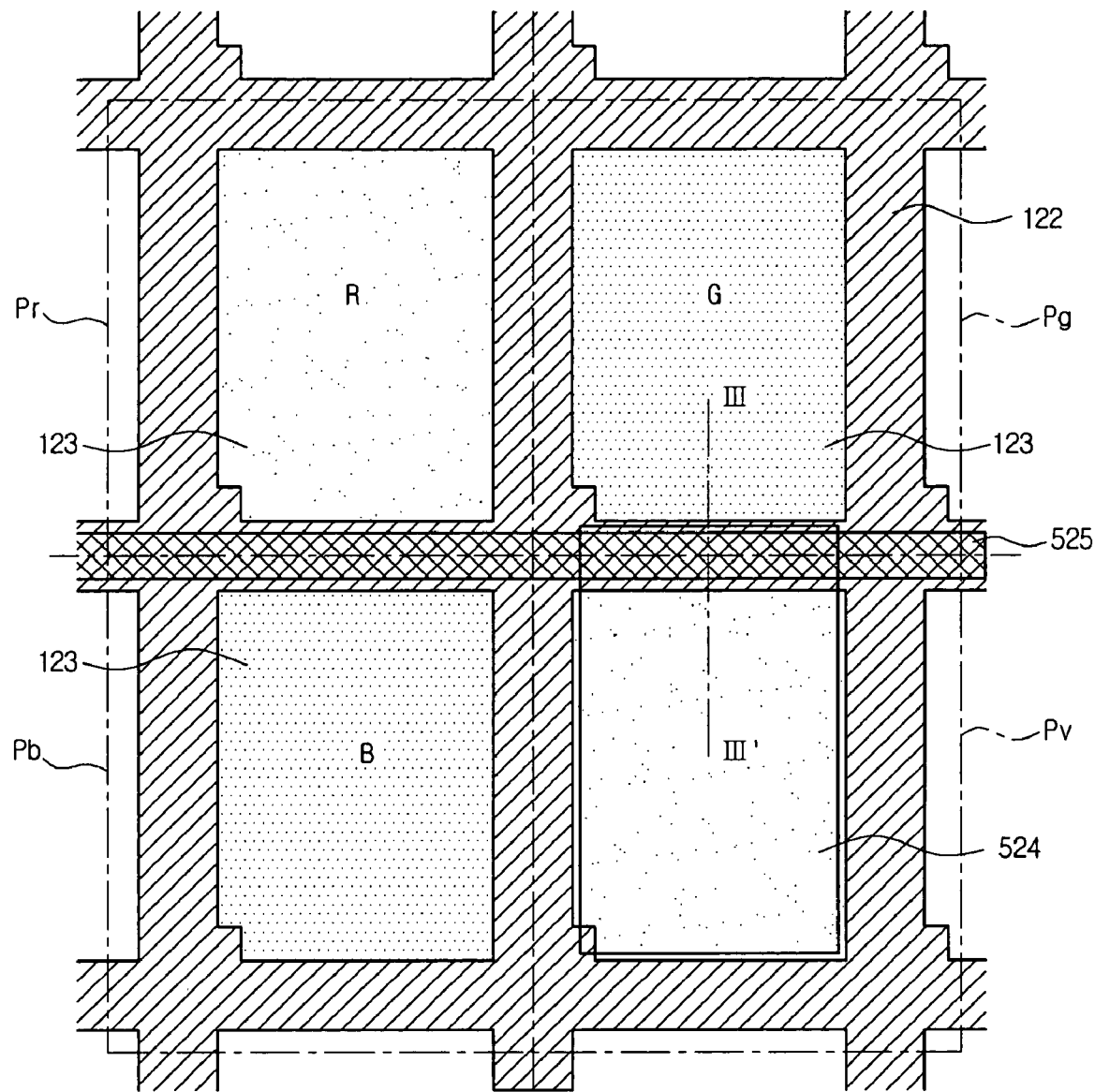
FIG. 12 is a plan view illustrating a partial portion of a color filter substrate (i.e., an upper substrate) in a liquid crystal panel according to an embodiment of the present invention.
Figure 13:
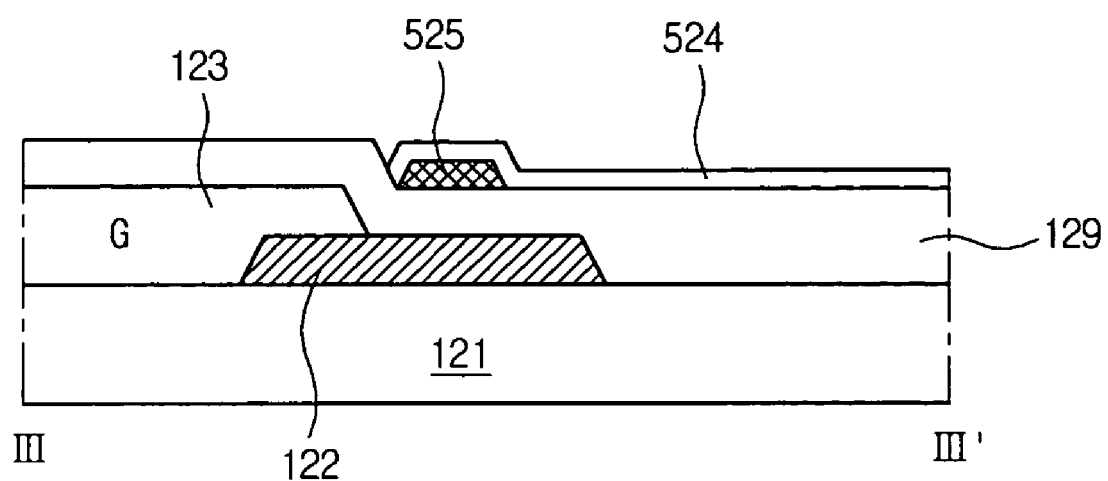
FIG. 13 is a cross-sectional view taken along III-III of FIG. 12.

FIG. 12 is a plan view illustrating a partial portion of a color filter substrate (i.e., an upper substrate) in a liquid crystal display panel according to an embodiment of the present invention, and FIG. 13 is a cross-sectional view taken along III-III of FIG. 12.

Referring to FIGS. 5, 12, and 13, black matrixes 122 formed of metal such as Cr or CrOx having an optical density of 3.5 or higher, or an organic material such as a carbon based material are formed on the upper substrate 121 facing the lower substrate 111 to block light leakage regions at thin film transistor regions, the gate lines 112, data lines 115, and the neighboring regions.

Also, a color filter layer 123 where red, green, blue color resists containing dyes realizing colors are arranged in a sequence is formed in red, green, and blue sub-pixels Pr, Pg, and Pb on the upper substrate 121. An overcoat layer 129 for planarizing an inner surface of the upper substrate 121 is formed on the color filter layer 123.

Each of viewing angle controlling common electrodes 524 formed of a transparent electrode material is formed in each of the viewing angle controlling sub-pixels Pv of the upper substrate 121. The viewing angle controlling common electrodes 524 are formed of a transparent conductive metal having desirable light transmittance such as indium-tin-oxide and indium-zinc-oxide. Also, each of the viewing angle controlling common electrodes 524 is connected with each of the viewing angle controlling lines 525, which is formed on each of the black matrixes 122 and extends to an outer edge so that a signal can be applied.

The viewing angle controlling common lines 525 may be formed of a transparent conductive metal having desirable light transmittance such as indium-tin-oxide and indium-zinc-oxide, or may be formed of a low resistance metal such as Cu, Al, AlNd (aluminum neodymium), Mo, Cr, Ti, Ta, and MoW.

The lower substrate 111 and the upper substrate 121 are coupled to face each other using a sealant (not shown) printed along edges of the substrates and having an adhesive characteristic. A liquid crystal layer 131 is formed between the two substrates.

A first polarization plate 161 and a second polarization plate 162 attached on outer surfaces of the lower substrate and the upper substrate are arranged such that their transmittance axes are perpendicular to each other. A normally black mode is achieved by having a rubbing direction of an alignment layer formed on the lower substrate 111 parallel to a transmittance axis of one of the polarization plates.

A cell gap of each of the viewing angle controlling sub-pixels Pv is equal to or greater than cell gaps of red, green, and blue sub-pixels Pr, Pg, and Pb. This configuration increases a cell gap, so that brightness can be increased with a viewing angle. In turn, a contrast ratio can be reduced in this construction.

The in-plane switching (IPS) mode liquid crystal display device (LCD) having the above construction can be operated in a wide viewing angle mode or a narrow viewing angle mode. When the IPS mode LCD is operated in the wide viewing angle mode, a black voltage is applied or not applied to each of the viewing angle controlling sub-pixels Pv. On the other hand, when the IPS mode LCD is operated in a narrow viewing angle mode, a voltage is applied to each of the viewing angle controlling sub-pixels Pv.

In turn, a vertical electric field is generated in each of the viewing angle controlling sub-pixels Pv to allow liquid crystal molecules therein to move vertically. Therefore, a transmittance state viewed from the front side maintains a black state regardless of voltage application. A transmittance state viewed at an inclination angel can be changed with voltage application.

During the wide viewing angle mode, a black voltage is applied to the viewing angle sub-pixels Pv to generate a black state. When a voltage is not applied to each of the red, green, and blue sub-pixels Pr, Pg, and Pb, liquid crystal molecules 132 are arranged as illustrated in FIG. 6A, so that a black state is displayed. On the contrary, when a voltage is applied to each of the red, green, and blue sub-pixels Pr, Pg, and Pb, liquid crystal molecules 132 are arranged parallel to the direction of an electric field as illustrated in FIG. 6B, so that a white state is displayed.

As described above, the in-plane switching mode liquid crystal display according to an embodiment of the present invention may be operated in the wide viewing angle mode or the narrow viewing angle mode. When the IPS-mode LCD is operated in the wide viewing angle mode, colors from black to white are realized in the wide viewing angle with applying a voltage to each of the red, green, and blue sub-pixels, and the viewing angle controlling sub-pixels Pv are off to maintain a black state.

Figure 7A:
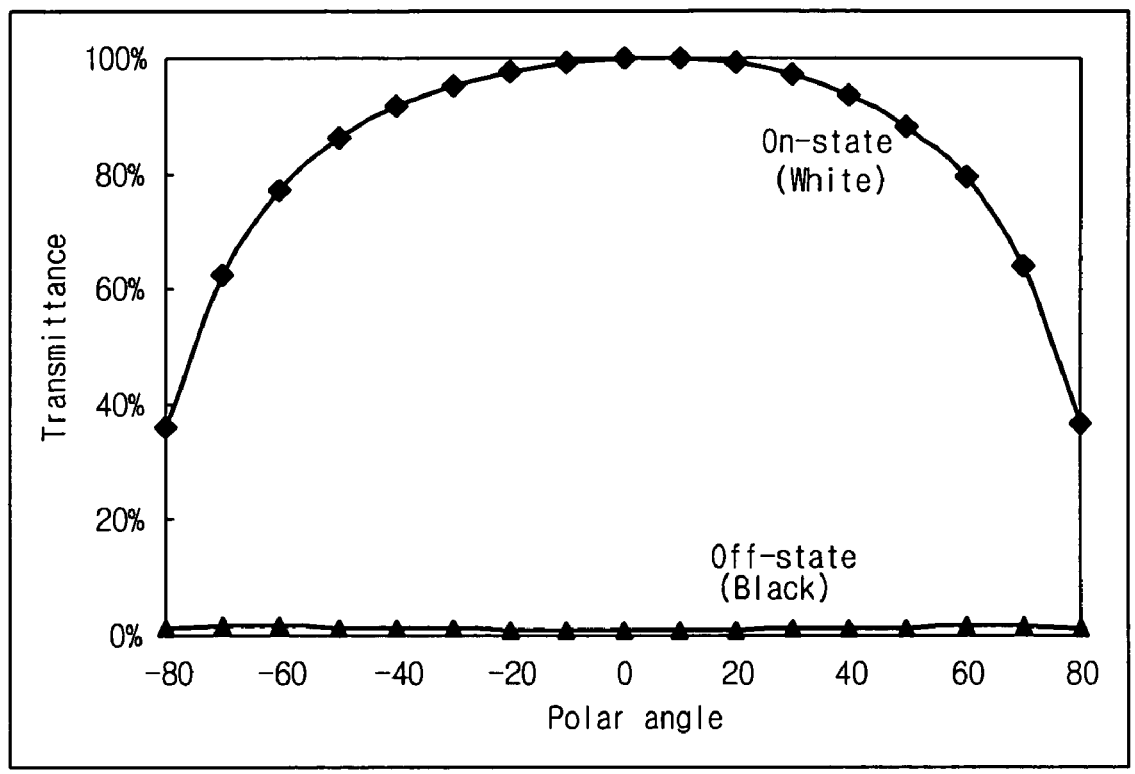
FIGS. 7A and 7B are graphs illustrating transmittance characteristics the in-plane switching mode liquid crystal display device in a wide viewing angle mode of FIG. 5.
Figure 7B:
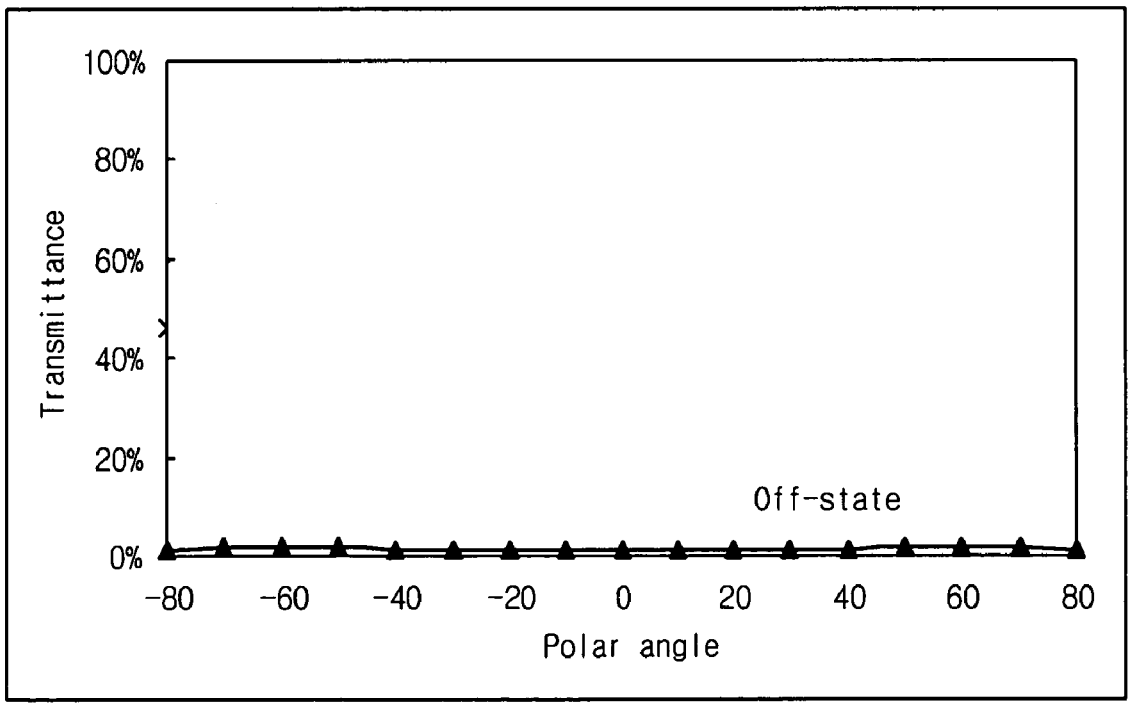
Figure 8:
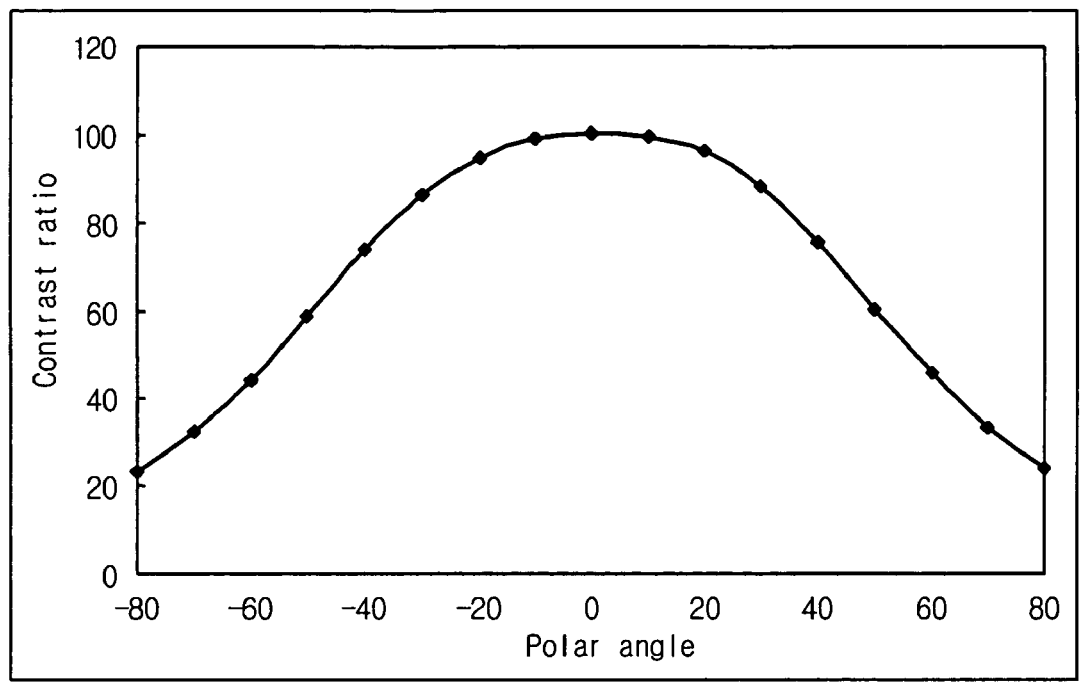
FIG. 8 is a view illustrating a contrast ratio change with a viewing angle in viewing angle controlling sub-pixels when the in-plane switching mode liquid crystal display device of FIG. 5 is operated in a wide viewing angle mode.

FIGS. 7A and 7B are graphs illustrating transmittance characteristics in a wide viewing angle mode according to an embodiment of the present invention. FIG. 8 is a view illustrating a contrast ratio change with a viewing angle in viewing angle controlling sub-pixels when an in-plane switching mode liquid crystal display device according to an embodiment of the present invention is operated in a wide viewing angle mode.

Referring to FIGS. 7A and 7B, the viewing angle controlling sub-pixels Pv has a transmittance about 0% to maintain a black state during the wide viewing angle mode. Each of the red, green, and blue sub-pixels Pr, Pg, and Pb has a transmittance close to 0% and become a black state when a voltage is not applied (i.e., off-state), and becomes a white state over the entire viewing angle when a voltage is applied (i.e., on-state), so that a screen can viewed by a user.

Also, during the wide viewing angle mode, a contrast ratio is uniform and excellent over the entire viewing angle, which is illustrated in the graph of FIG. 8.

The in-plane switching mode liquid crystal display device according to an embodiment of the present invention uses a selection signal in order to selectively switching between the wide viewing angle mode and the narrow viewing angle mode. When the wide viewing angle mode is selected by the selection signal, each of the viewing angle controlling sub-pixels is turned off. When the narrow viewing angle mode is selected by the selection signal, each of the viewing angle controlling sub-pixels is turned on.

Operations of the in-plane switching mode liquid crystal display device according to an embodiment of the present invention operated in the narrow viewing angle mode will be described in detail below.

Figure 9A:
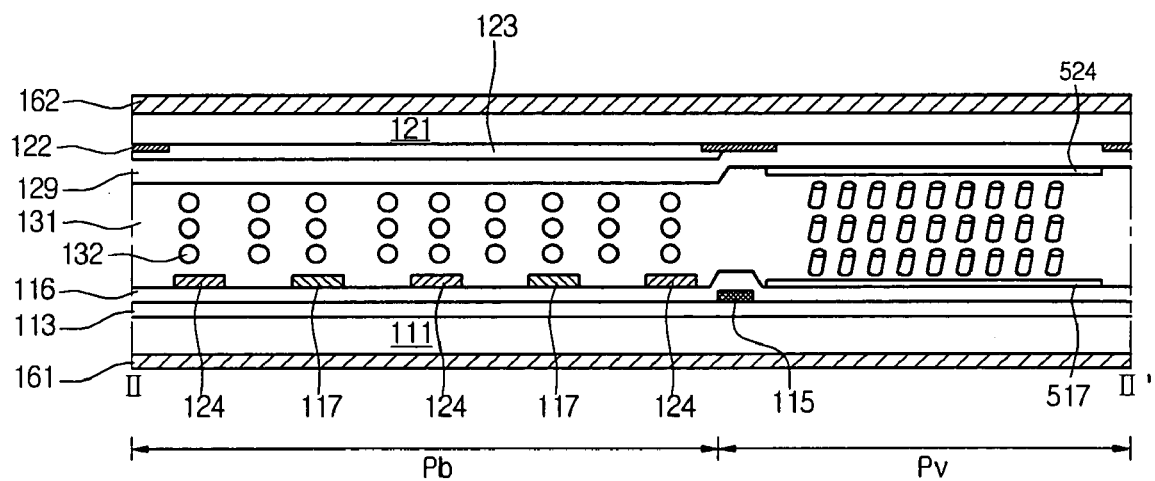
FIGS. 9A through 9C are cross-sectional views of the in-plane switching mode liquid crystal display device, taken along II-II of FIG. 5, operated in a narrow viewing angle mode.
Figure 9B:
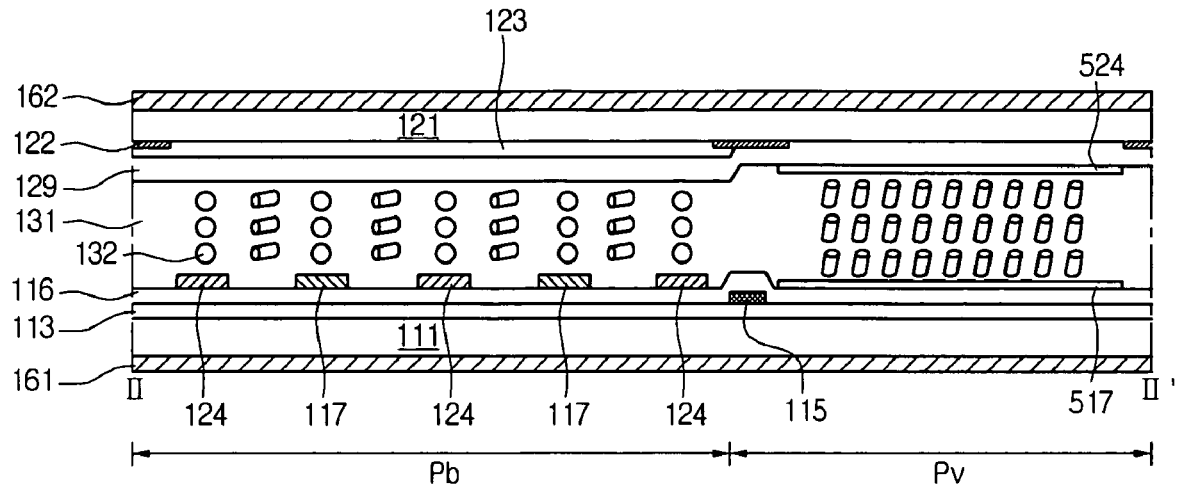
Figure 9C:
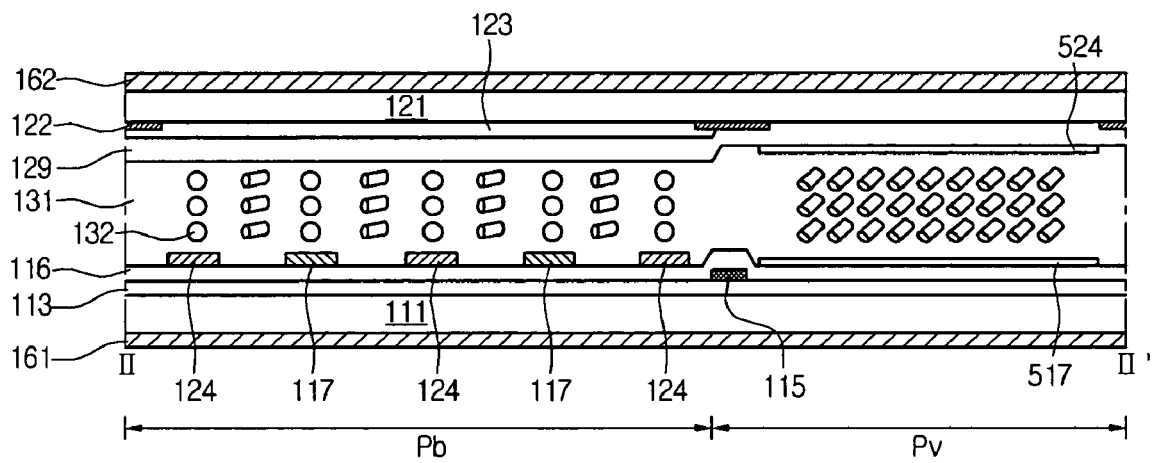
Figure 10A:
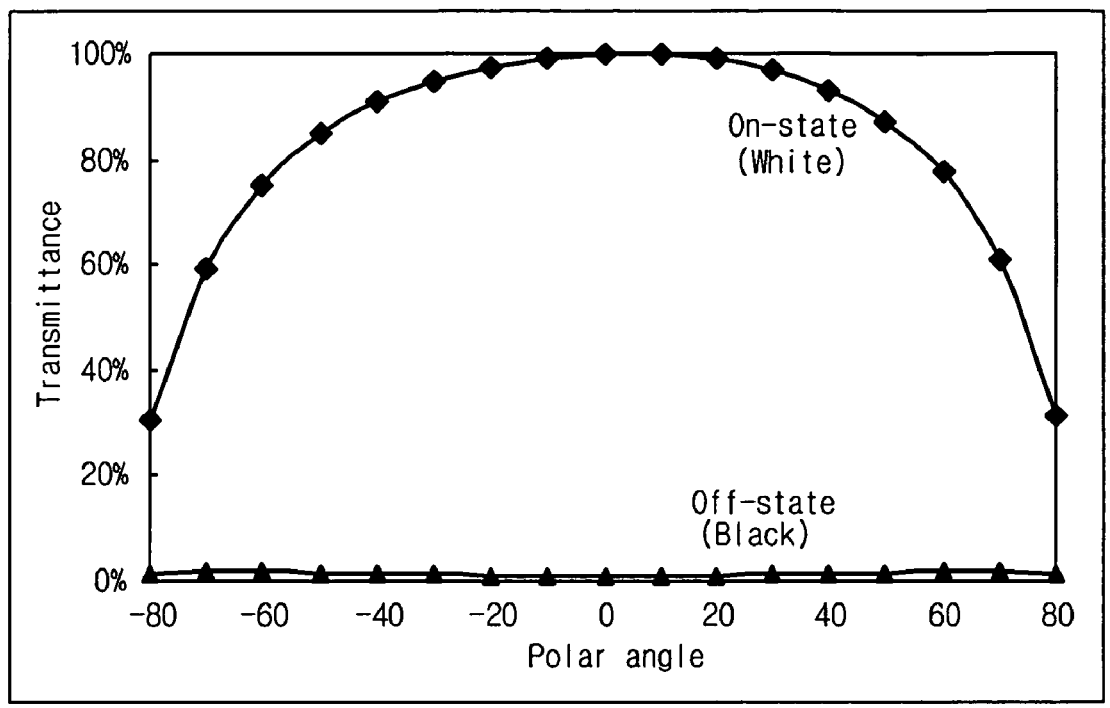
FIGS. 10A and 10B are graphs illustrating transmittance characteristics of the in-plane switching mode liquid crystal display device of FIG. 5 operated in a narrow viewing angle mode.
Figure 10B:
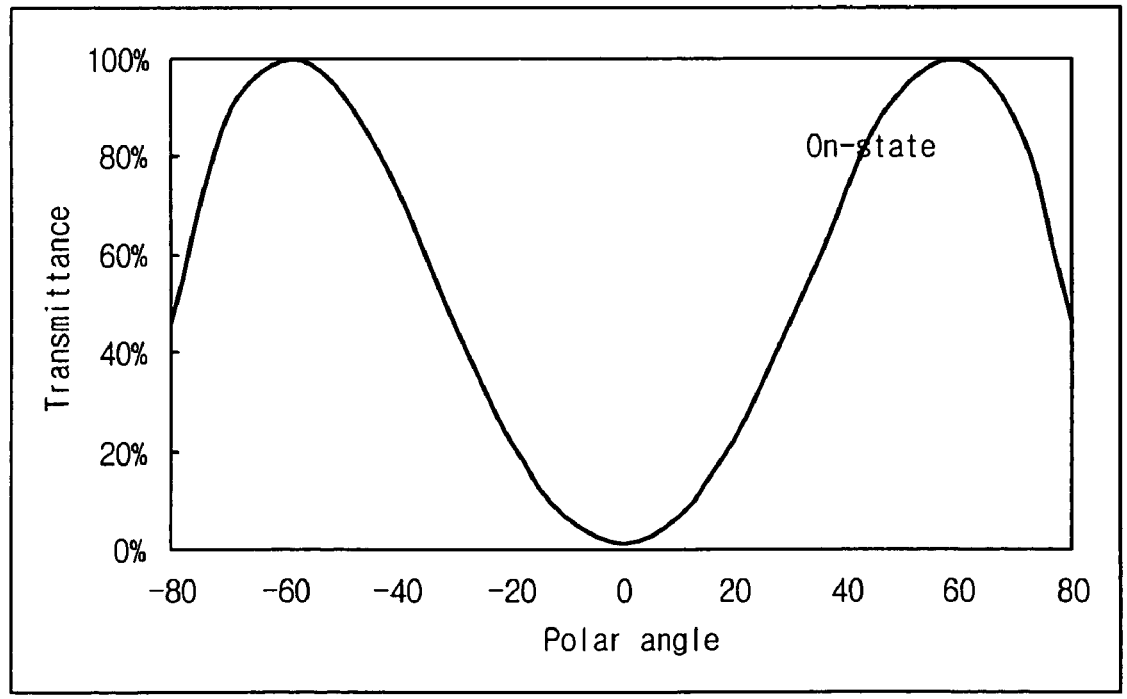
Figure 11:
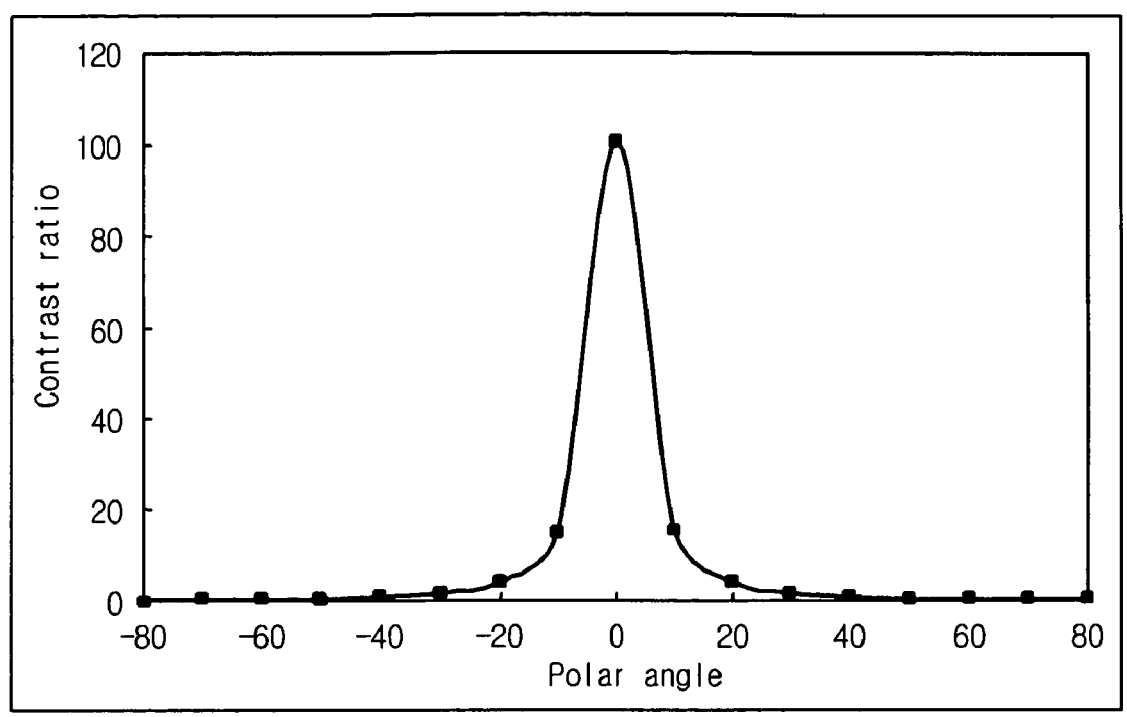
FIG. 11 is a view illustrating a contrast ratio change with a viewing angle in viewing angle controlling sub-pixels when the in-plane switching mode liquid crystal display device of FIG. 5 is operated in a narrow viewing angle mode.

FIGS. 9A through 9C are cross-sectional views of an IPS LCD with a narrow viewing angle mode according to an embodiment of the present invention taken along II-II of FIG. 5. FIGS. 10A and 10B are graphs illustrating transmittance characteristics during a narrow viewing angle mode according to an embodiment of the present invention. FIG. 11 is a view illustrating a contrast ratio change with a viewing angle in viewing angle controlling sub-pixels when an in-plane switching mode liquid crystal display device according to an embodiment of the present invention operated in a narrow viewing angle mode.

FIG. 9A is a cross-sectional view of an in-plane switching mode liquid crystal display device in a narrow viewing angle mode when a voltage is not applied (off-state), and FIG. 9B is a cross-sectional view of an in-plane switching mode liquid crystal display device in a narrow viewing angle mode when a voltage is applied (on-state).

According to the in-plane switching mode liquid crystal display device operated in a narrow viewing angle mode, a vertical electric field is formed between each of viewing angle controlling common electrodes 524 and each of viewing angle controlling pixel electrodes 517 in each of the viewing angle controlling sub-pixels, so that liquid crystal molecules 132 are vertically oriented.

Referring to FIGS. 9A and 10A, when a voltage is not applied, a horizontal electric field is not formed between each of the common electrodes 124 and each of the pixel electrodes 117 in each of the red, green, and blue sub-pixels, liquid crystal molecules 132 oriented between each of the common electrodes 124 and each of the pixel electrodes 117 are not moved from an initial arrangement, so that the liquid crystal molecules 132 forms a normally black state.

Also, a vertical electric field is formed between each of the viewing angle controlling pixel electrodes 517 of the lower substrate and each of the viewing angle controlling common electrodes 524 of the upper substrate in each of the viewing angle controlling sub-pixel Pv, so that liquid crystal molecules 132 are vertically elected and oriented.

Therefore, a phase difference of the liquid crystal molecules 132 is not generated at a front viewing angle and thus a normally black state is formed. On the contrary, retardation is considerably generated and thus a contrast is reduced at a horizontal viewing angle direction by the erected liquid crystal molecules 132 in the viewing angle controlling sub-pixels. Therefore, the horizontal viewing angle is reduced and thus a narrow viewing angle is achieved.

Also, referring to FIGS. 9B and 10A, since a horizontal electric field is formed between each of the common electric fields 124 and each of the pixel electrodes 117 when a voltage is applied (on-state), long axes of the liquid crystal molecules 132 contained between each of the common electric fields 124 and each of the pixel electrodes 117 are oriented to be parallel to the direction of the electric field. When the liquid crystal molecules have negative dielectric anisotropy, the short axes of the liquid crystal molecules 132 are oriented to be parallel to the direction of the electric field.

On the other hand, a vertical electric field is formed between each of the viewing angle controlling pixel electrodes 517 of the lower substrate 111 and each of the viewing angle controlling common electrodes 524 of the upper substrate 121 in each of the viewing angle controlling sub-pixel Pv, so that liquid crystal molecules 132 are vertically elected and oriented.

Therefore, a white state is seen as the entire view when viewed from the front viewing angles, but retardation is considerably generated by the erected liquid crystal molecules contained in the viewing angle controlling sub-pixels Pv. When it is viewed from the horizontal viewing angle directions, a contrast is reduced, thereby deteriorating the horizontal viewing angles. As a result, a narrow viewing angle is achieved.

According to the in-plane switching mode liquid crystal display device of an embodiment of the present invention having the above construction, a voltage is applied to each of the viewing angle controlling sub-pixels Pv and transmittance thereof is close to 0%. Thus a block state is achieved when viewed from the front viewing angles and a white state is achieved when viewed from the side viewing angles (i.e., horizontal viewing angles) during the narrow viewing angle mode, as illustrated in FIG. 10B.

As described above, the retardation is considerably generated at the horizontal viewing angle directions by the erected liquid crystal molecules 132 contained in each of the viewing angle controlling sub-pixels Pv and contrast is reduced. Thus, the horizontal viewing angle is reduced and the narrow viewing angle is achieved as illustrated in FIG. 11.

Referring to FIG. 9C, it is possible to control a vertical electric field formed between each of the viewing angle controlling common electrodes 524 and each of the viewing angle pixel electrodes 517 by controlling a voltage applied to each of the viewing angle controlling sub-pixels Pv during the narrow viewing angle mode. Therefore, the retardation value of the liquid crystal molecules 132 in the horizontal viewing angle direction can be controlled.

That is, a vertical electric field can be formed between each of the viewing angle controlling pixel electrodes 517 and each of the viewing angle controlling common electrodes 524 contained in each of the viewing angle controlling sub-pixels by at least one pixel voltage level. Therefore, a user can control a viewing angle at which a screen is viewed as mush as desired.

Accordingly, an embodiment of the present invention provides variable viewing ranges to a user, and provides a high definition screen together without inconvenience even when the display device is used by one or more persons.

In an embodiment of the present invention, the red, green, and blue sub-pixels Pr, Pg, Pb, and the viewing angle controlling sub-pixels Pv may be arranged in various ways. For example, the red, green, blue, and viewing angle controlling sub-pixels may be horizontally arranged, which will be described below.

Figure 14:
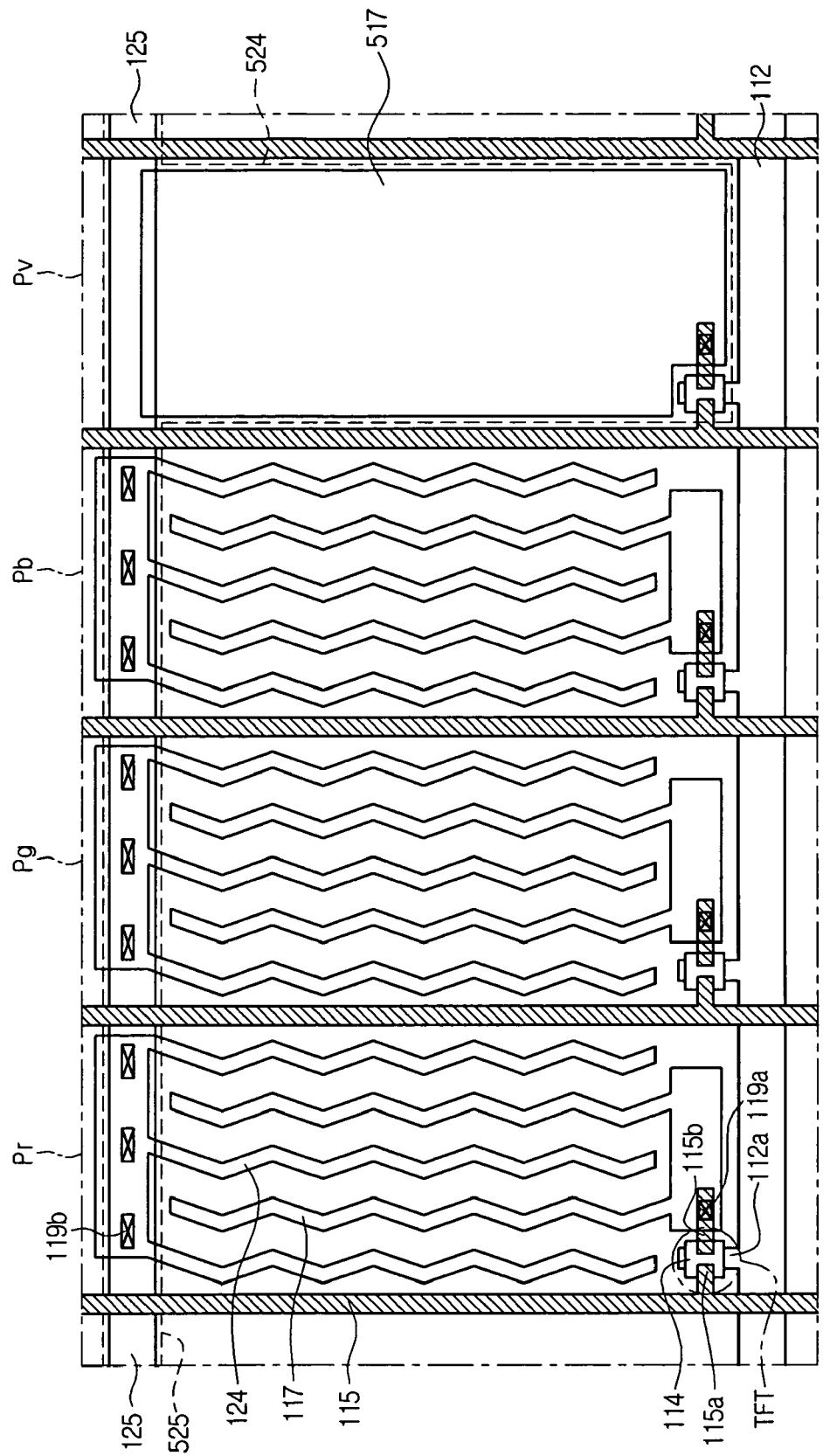
FIG. 14 is a plan view illustrating an in-plane switching mode liquid crystal display device according to another embodiment of the present invention.

FIG. 14 is a plan view illustrating an in-plane switching mode liquid crystal display device according to another embodiment of the present invention. Since the reference numerals of FIG. 14 are the same as those of FIG. 5, detailed description thereof will be omitted.

As illustrated in FIG. 14, according to the in-plane switching mode liquid crystal display device according to another embodiment of the present invention, the red, green, and blue sub-pixels Pr, Pg, Pb, and the viewing angle controlling sub-pixels Pv may be arranged horizontally. Also, the viewing angle controlling sub-pixels may be arranged in random, and the red, green, and blue sub-pixels Pr, Pg, and Pb may be arranged in various ways.

Figure 15:
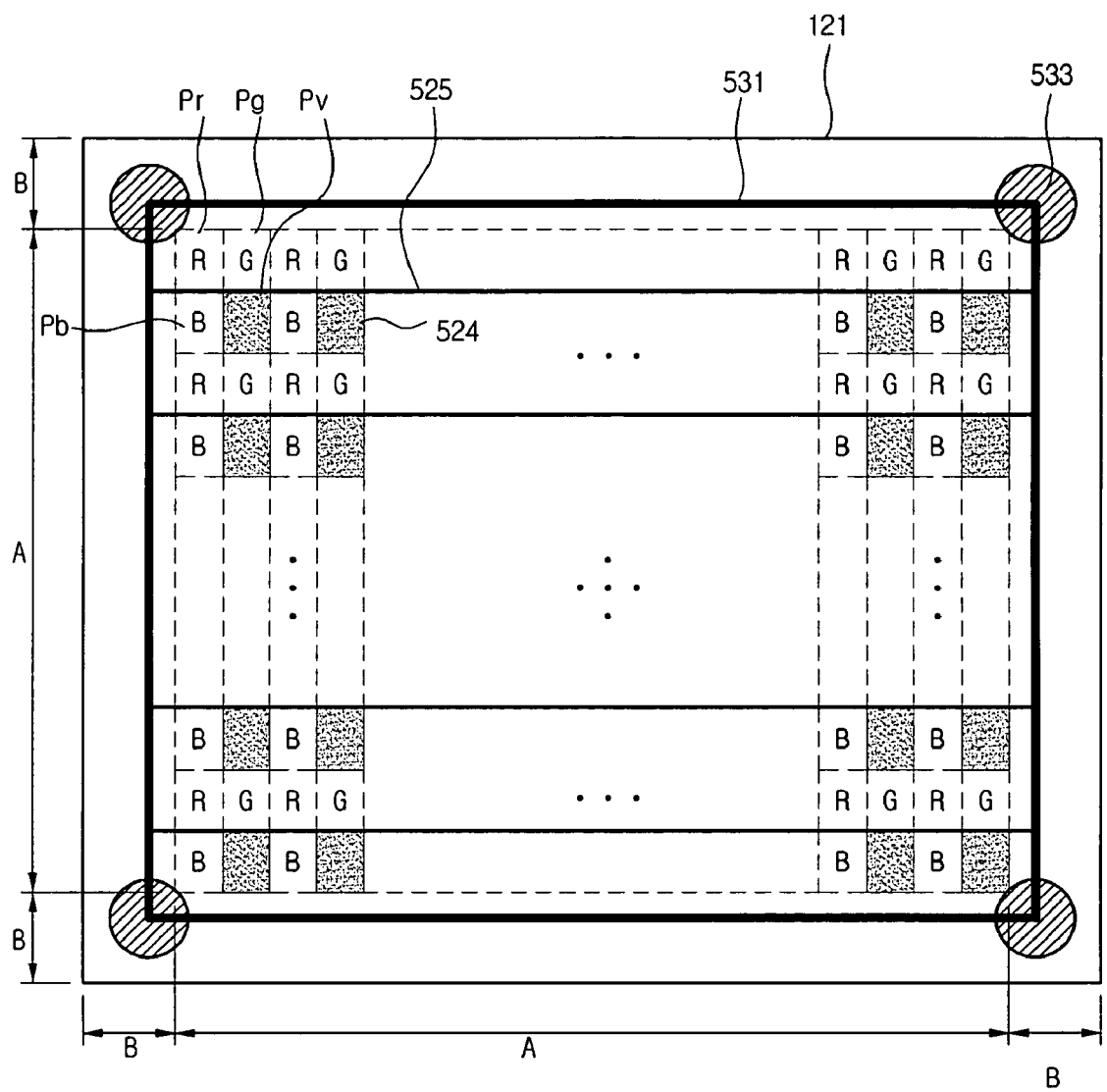
FIG. 15 is a plan view illustrating a structure of lines formed in an upper substrate of an in-plane switching mode liquid crystal display device of FIG. 14.

FIG. 15 is a plan view illustrating a structure of lines formed in an upper substrate of an in-plane switching mode liquid crystal display device according to an embodiment of the present invention.

Referring to FIG. 15, the upper substrate 121 is divided into a screen display region A where liquid crystal molecules are driven to display a screen, and an outer edge region B, which is a non-screen display region B. The screen display region A of the upper substrate 121 includes the red, green, blue sub-pixels Pr, Pg, and Pb having red, green, and blue color filters, respectively. The screen display region A also includes the viewing angle controlling sub-pixels Pv, each of which does not have a color filter but has the viewing angle controlling common electrode 524.

Also, each of the viewing angle controlling common electrodes 524 is connected with each of the viewing angle controlling common lines 525, which extends to the outer edge B of the upper substrate 121. A conductive line 531 is formed along the outer edge B, and the conductive line 531 is connected with the viewing angle controlling common lines 525. When the viewing angle controlling common lines 525 are formed of the same material as that of the viewing angle common electrodes 524, the conductive line 531 may be also collectively patterned using the same material as that of the viewing angle controlling common electrodes 524. Also, the conductive line 531 may be formed of a metal line and connected with the viewing angle controlling common lines 525.

When the viewing angle controlling common lines 525 are formed of metal lines, not the same material as that of the viewing angle common electrodes 524, the conductive line 531 may be collectively patterned using the same metal lines as those of the viewing angle controlling common lines 525. Alternatively, the conductive line 531 may be formed of the same materials as those of the viewing angle controlling common electrodes 524 and connected with the viewing angle controlling common lines 525.

Also, the conductive line 531 formed on the upper substrate 121 includes at least one conductive connection pattern 533 (e.g., Ag dot) formed at a predetermined position, for conducting the upper substrate and the lower substrate to allow the conductive line 531 to receive a control signal from the lower substrate.

Therefore, when the liquid crystal display device according to an embodiment of the present invention operated in the wide viewing angle mode or a narrow viewing angle mode, the liquid crystal display device uses a selection signal in order to switch between the wide viewing angle mode and the narrow viewing angle mode. When the wide viewing angle mode is selected by the selection signal, the viewing angle controlling sub-pixels Pv are turned off. When the narrow viewing angle mode is selected by the selection signal, the viewing angle controlling sub-pixels Pv are turned on.

When the narrow viewing angle mode is selected, the viewing angle controlling sub-pixels Pv is turned on and a drive voltage is applied, which is inputted from a circuit substrate of the lower substrate to the conductive line 531 through the conductive connection pattern 533 for conducting the upper substrate and the lower substrate, and is applied to the viewing angle controlling common electrodes 524 through the viewing angle controlling common lines 525 electrically connected with the conductive line 531. As such, a vertical electric field between the viewing angle controlling common electrodes 524 (shown in FIG. 12) and the viewing angle controlling pixel electrodes 517 (shown in FIG. 5) can be controlled. Therefore, a retardation value in the horizontal viewing angle direction of the liquid crystal molecules 132 can also be controlled, so that the narrow viewing angle mode is realized.

Further, a variety of patterns for preventing static electricity may be connected to the conductive line 531.

Figure 16:
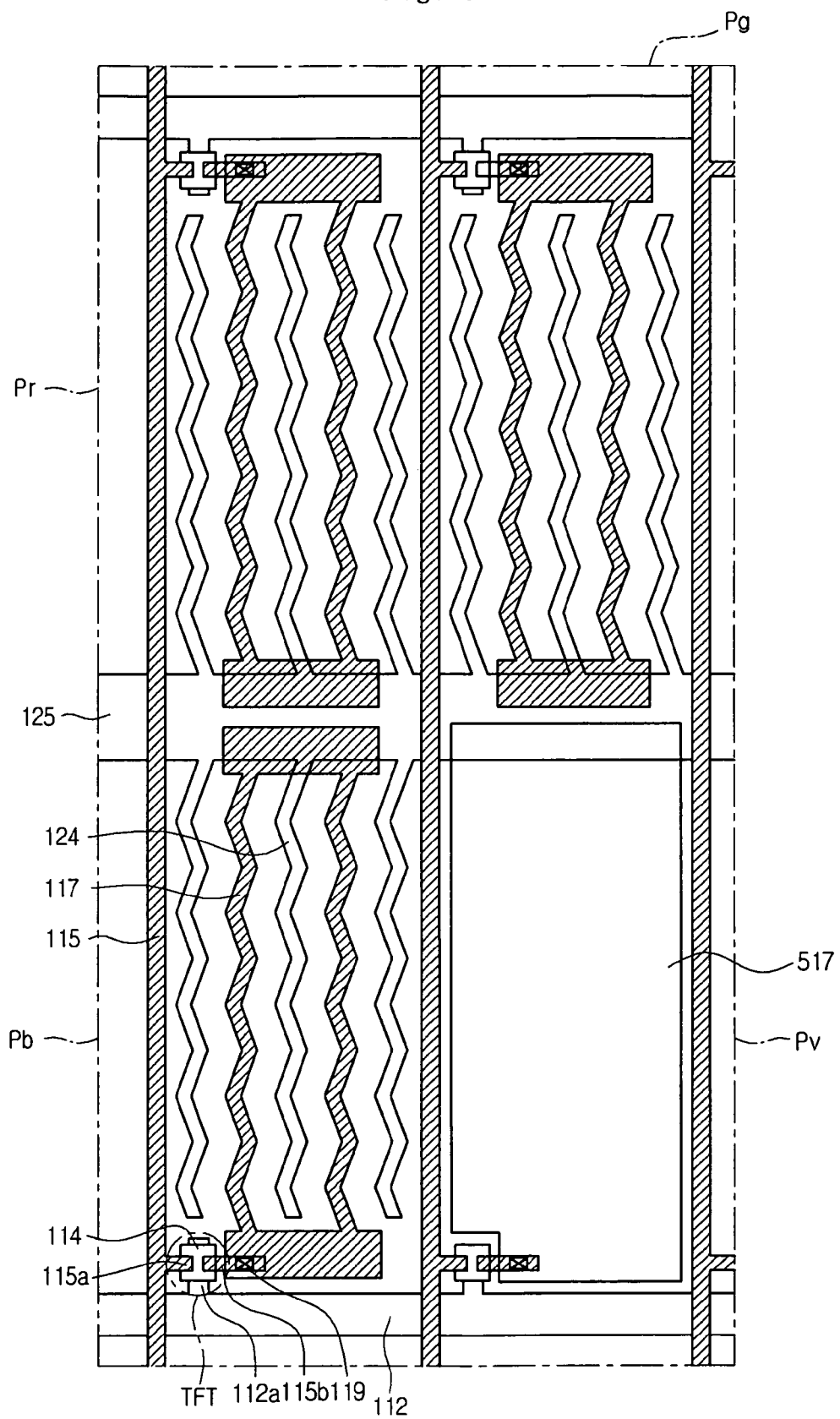
FIGS. 16 and 17 are plan views illustrating a thin film transistor substrate and a color filter substrate of an in-plan switching mode liquid crystal display device according to another embodiment of the present invention.
Figure 17:
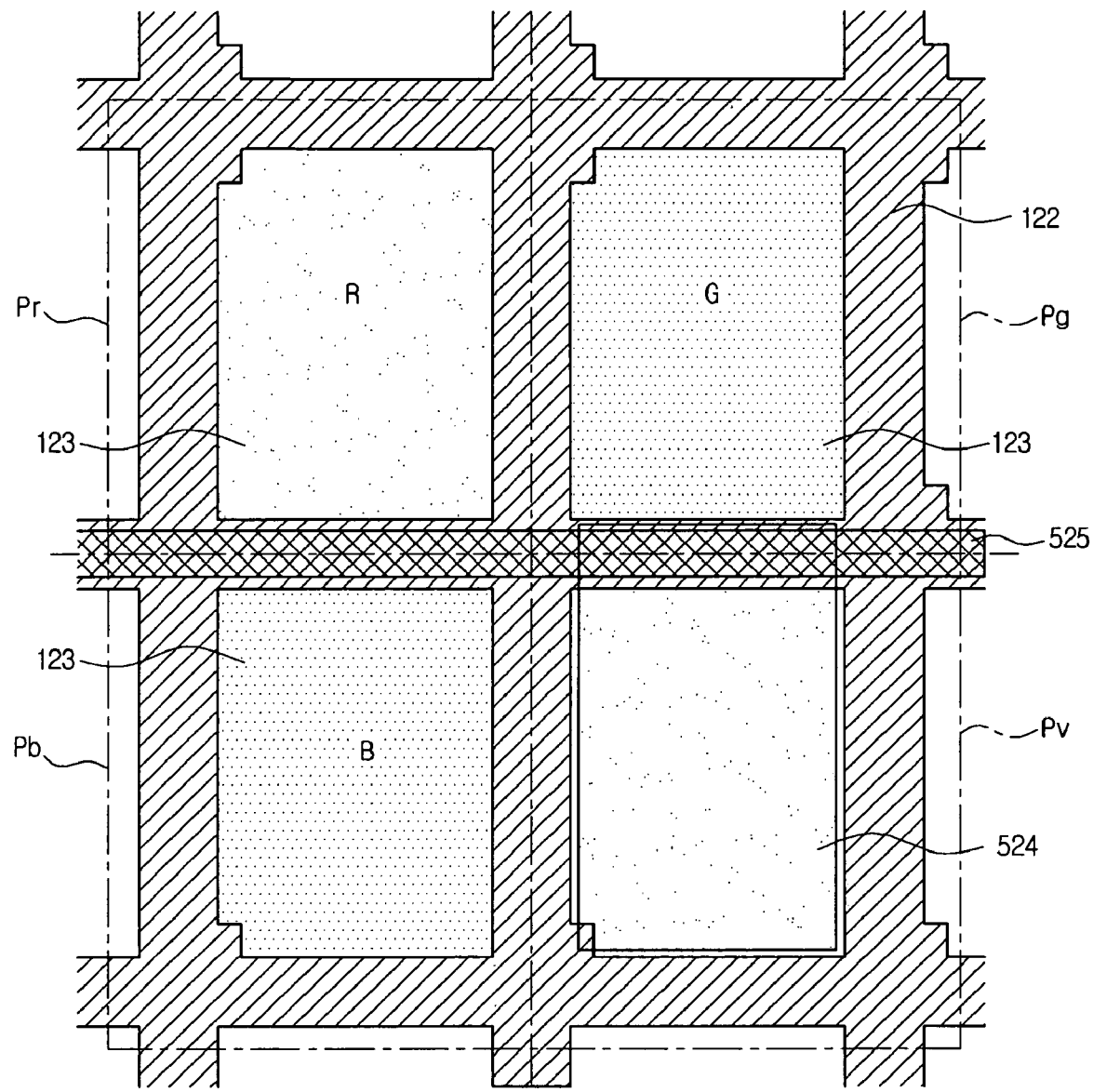

FIGS. 16 and 17 are plan views illustrating a thin film transistor substrate and a color filter substrate of an in-plane switching mode liquid crystal display device according to another embodiment of the present invention.

Referring to FIG. 16, a lower substrate of a liquid crystal display device includes a plurality of gate lines 112 and data lines 115 vertically crossing each other, and defining sub-pixels Pr, Pg, Pb, and Pv. Thin film transistors (TFTs) having a gate electrode 112a and source/drain electrodes 115a and 115b are formed at each area where the gate lines and data lines 112 and 115 cross each other to switch the sub-pixels Pr, Pg, Pb, and Pv. Further, a plurality of common electrodes Vcom 124 is connected to a first common line 125 parallel to the gate lines 112. Each pixel electrode 117 is connected to each TFT and parallel to the common electrode. In addition, a second pixel electrode 517 (i.e., viewing angle controlling pixel electrode) is connected to the TFT and has a stave shape within each of the viewing angle controlling sub-pixels Pv.

FIG. 17 is a plan view illustrating a color filter substrate (or upper substrate) of an in-plane switching mode liquid crystal display device according to another embodiment of the present invention. As shown in FIG. 17, black matrixes 122 of metal are from on the upper substrate 111 facing the lower substrate 112 to block light leakage at TFT regions, the gate lines 112, data lines 115, and the neighboring regions. The black matrixes may be formed of metal having an optical density of 3.5 or higher, such as Cr and CrOx or an organic material such as a carbon based material.

Further, a second common line 525 is formed at regions between the red color resistor R and the blue color resistor B, and the green color register G and the viewing angle controlling common electrode 524. Each viewing angle controlling common electrode 524 of a transparent electrode material, such as indium tin oxide, is formed in each of the viewing angle controlling sub-pixels Pv of the upper substrate 121.

In this embodiment, the first and second common lines 125 and 252 are formed on the first and second substrates, respectively, so as to overlap each other when the two substrates are attached to each other. With such a configuration, a misalignment of liquid crystal can be prevented, and an improved aperture ratio can be obtained. In addition, it can reduce an abrupt drop in voltage difference.

According to embodiments of the present invention, a wide viewing angle mode or a narrow viewing angle mode can be selectively operated in the in-plane switching mode liquid crystal display device, thereby protecting a personal display device user's privacy and/or security in the crowed public place.

Also, embodiments of the present invention control a viewing angle by providing the viewing angle controlling sub-pixels within the liquid crystal panel without additionally installing a separate device on the outer side of the liquid crystal panel in order to control the viewing angle, thereby simplifying the manufacturing process and achieving desirable light efficiency.

Furthermore, an embodiment of the present invention flexibly provides variable viewing ranges to a user and allows a user to conveniently view a high definition screen even when the liquid crystal display device is used by one or more persons.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An in-plane switching mode liquid crystal display device comprising:
    a first substrate and a second substrate;
    gate lines and data lines intersecting each other on the first substrate and defining red, green, blue sub-pixels, and viewing angle controlling sub-pixels;
    thin film transistors at the intersections of the gate lines and the data lines;
    first pixel electrodes and first common electrodes spaced apart from each other and alternately disposed at the red, green, and blue sub-pixels of the first substrate;
    second pixel electrodes at the viewing angle controlling sub-pixels of the first substrate;
    second common electrodes at the viewing angle controlling sub-pixels of the second substrate corresponding to the second pixel electrodes; and
    a liquid crystal layer between the first substrate and the second substrate,
    wherein the viewing angle controlling sub-pixels are driven by a vertical electric field,
    wherein the red, green, and blue sub-pixels are driven by a horizontal electric field, and
    wherein the viewing angle controlling sub-pixels becomes an off-state in a wide viewing angle mode and an on-state in a narrow viewing angel mode.

2. The in-plane switching mode liquid crystal display device according to claim 1, further comprising a first polarization plate and a second polarization plate attached on one side of the first substrate and one side of the second substrate, respectively.

3. The in-plane switching mode liquid crystal display device according to claim 1, further comparing red, green, and blue color filters on the red, green, and blue sub-pixels, of the second substrate, respectively.

4. The in-plane switching mode liquid crystal display device according to claim 1, further comprising black matrixes on boundaries of the sub-pixels and the thin film transistors.

5. The in-plane switching mode liquid crystal display device according to claim 1, further comprising second common lines connected with the second common electrodes extending to an outer edge of the liquid crystal display device.

6. The in-plane switching mode liquid crystal display device according to claim 5, wherein the common lines are formed of one of a transparent conductive material and metal.

7. The in-plane switching mode liquid crystal display device according to claim 1, wherein the second common electrodes are formed of a transparent conductive material.

8. The in-plane switching mode liquid crystal display device according to claim 1, wherein the viewing angle controlling sub-pixels have a cell gap equal to or greater than that of the red, green, and blue sub-pixels.

9. The in-plane switching mode liquid crystal display device according to claim 1, wherein the first common electrodes and the first pixel electrodes are formed in a straight line or a zigzag form.

10. The in-plane switching mode liquid crystal display device according to claim 1, further comprising a drive circuit for providing at least one pixel voltage level to generate a vertical electric field between the second pixel electrodes at the viewing angle controlling sub-pixels and the second common electrodes.

11. The in-plane switching mode liquid crystal display device according to claim 5, wherein the second common lines are connected with a conductive line at an outer edge of the second substrate.

12. The in-plane switching mode liquid crystal display device according to claim 11, further comprising a conductive connection pattern for electrically connecting the first and second substrates.

13. The in-plane switching mode liquid crystal display device according to claim 1, further comprising first and second common lines respectively on the first and second substrates overlapped each other.

14. The in-plane switching mode liquid crystal display device according to claim 13, wherein the second pixel electrode is connected to the first common line.

15. A method of fabricating an in-plane switching mode liquid crystal display device, comprising:
   forming gate lines and data lines intersecting each other on a first substrate and defining red, green, and blue sub-pixels, and viewing angle controlling sub-pixels;
   forming transistors on the intersections of the gate lines and the data lines;
   forming first common electrodes parallel to the data lines and first pixel electrodes alternately arranged with respect to the first common electrodes at the red, green, and blue sub-pixels of the first substrate;
   forming second pixel electrodes at the viewing angle controlling sub-pixels of the first substrate;
   forming second common electrodes at the viewing angle controlling sub-pixels of a Second substrate corresponding to the second pixel electrode; and
   forming a liquid crystal layer between the first substrate and the second Substrate,
   wherein the viewing angle controlling sub-pixels are driven by a vertical electric field,
   wherein the red, green, and blue sub-pixels are driven by a horizontal electric field, and
   wherein the viewing angle controlling sub-pixels becomes an off-state in a wide viewing angle mode and an on-state in a narrow viewing angel mode.

16. The method according to claim 15, further forming a polarization plate on one side of each of the first substrate and the second substrate.

17. The method according to claim 15, further comprising forming red, green, and blue color filters on the second substrate.

18. The method according to claim 15, further comprising second common lines for connecting with the second common electrodes.

19. The method according to claim 15, wherein each of the second common electrodes is formed of a transparent conductive material.

20. The method according to claim 18, wherein the second common lines are formed of a transparent conductive material or metal.

21. The method according to claim 17, further comprising forming black matrixes at boundaries of the color filters.

22. The method according to claim 17, further comprising forming an overcoat layer on the color filters.

23. The method according to claim 15, wherein the first common electrodes are formed of the same material as the gate lines.

24. The method according to claim 15, wherein the first common electrodes are formed of the same material as the first pixel electrodes.

25. The method according to claim 15, wherein the second common electrodes and the second pixel electrodes are applied by a voltage to generate a vertical electrical field.

26. The method according to claim 15, wherein the second pixel electrodes at the viewing angle controlling sub-pixels are applied by at least one voltage level.

27. The method according to claim 18, further comprising forming a conductive line electrically connected with the second common lines at an outer edge of the second substrate.

28. The method according to claim 18, further comprising forming a conductive connection pattern at the conductive line after the forming of the liquid crystal layer between the first and second substrates.

29. A liquid crystal display device, comprising:
   red, green, and blue sub-pixels having first pixel electrodes and first common electrodes alternately disposed on a first substrate;
   viewing angle controlling sub-pixels having second pixel electrodes on the first substrate and second common electrodes on a second substrate; and
   a liquid crystal layer between the first substrate and the second substrate, wherein the viewing angle controlling sub-pixels are driven by a vertical electric field, wherein the red, green, and blue sub-pixels are driven by a horizontal electric field, and wherein the viewing angle controlling sub-pixels are driven in a wide viewing angle mode without applying a voltage, and the viewing angle controlling sub-pixels are driven in a narrow viewing angle mode with applying the voltage.

30. The liquid crystal display device according to claim 29, wherein the applied voltage forms a transverse electric field in the red, green, and blue sub-pixels and a vertical electric field in the viewing angle controlling sub-pixels without applying the voltage.

31. The liquid crystal display device according to claim 29, wherein the viewing angle controlling sub-pixels produce black colors during the off-state and white colors during the on-state.

32. The liquid crystal display device according to claim 29, wherein the second pixel electrodes is applied by at least one voltage level to control a viewing angle range when the viewing angle controlling sub-pixels are operated in the narrow viewing angle mode.

33. A liquid crystal display device, comprising:
   first and second substrates facing each other;
   gate lines and data lines intersecting each other on the first substrate and defining at least four sub-pixels of first to fourth sub-pixels within a unit pixel;
   thin film transistors at the intersections of the gate lines and the data lines;

first pixel electrodes and first common electrodes spaced apart from each other and alternately disposed at the first to third sub-pixels of the first substrate;

second pixel electrodes at the fourth sub-pixel where the first pixel electrodes and first common electrodes are not disposed, the fourth sub-pixel being operated in a wide viewing angle mode during an off-state and in a narrow viewing angle mode during an on-state;

second common electrodes at the fourth sub-pixel of the second substrate corresponding to the second pixel electrodes; and a liquid crystal layer between the first substrate and the second substrate, wherein the fourth sub-pixels are driven by a vertical electric field, and wherein the first, second, and third sub-pixels are driven by a horizontal electric field.

34. The liquid crystal display device according to claim 33, wherein the applied voltage forms a vertical electric field in the viewing angle controlling sub-pixels with applying the voltage.

35. The liquid crystal display device according to claim 33, wherein the fourth sub-pixel transmits no light at a normal angle and light depending upon an applied voltage at an inclined angle.

36. The liquid crystal display device according to claim 33, wherein the second pixel electrodes is applied by at least one voltage level to control a viewing angle range when the fourth sub-pixel is operated in the narrow viewing angle mode.

* * * * *